Nov. 19, 1935.　　　S. HALVORSEN　　　2,021,360
STUFFING MACHINE
Filed June 12, 1929　　22 Sheets-Sheet 1

Inventor:
Severin Halvorsen

Nov. 19, 1935.  S. HALVORSEN  2,021,360
STUFFING MACHINE
Filed June 12, 1929   22 Sheets-Sheet 12

Inventor:
Severin Halvorsen

Nov. 19, 1935.    S. HALVORSEN    2,021,360
STUFFING MACHINE
Filed June 12, 1929    22 Sheets-Sheet 20
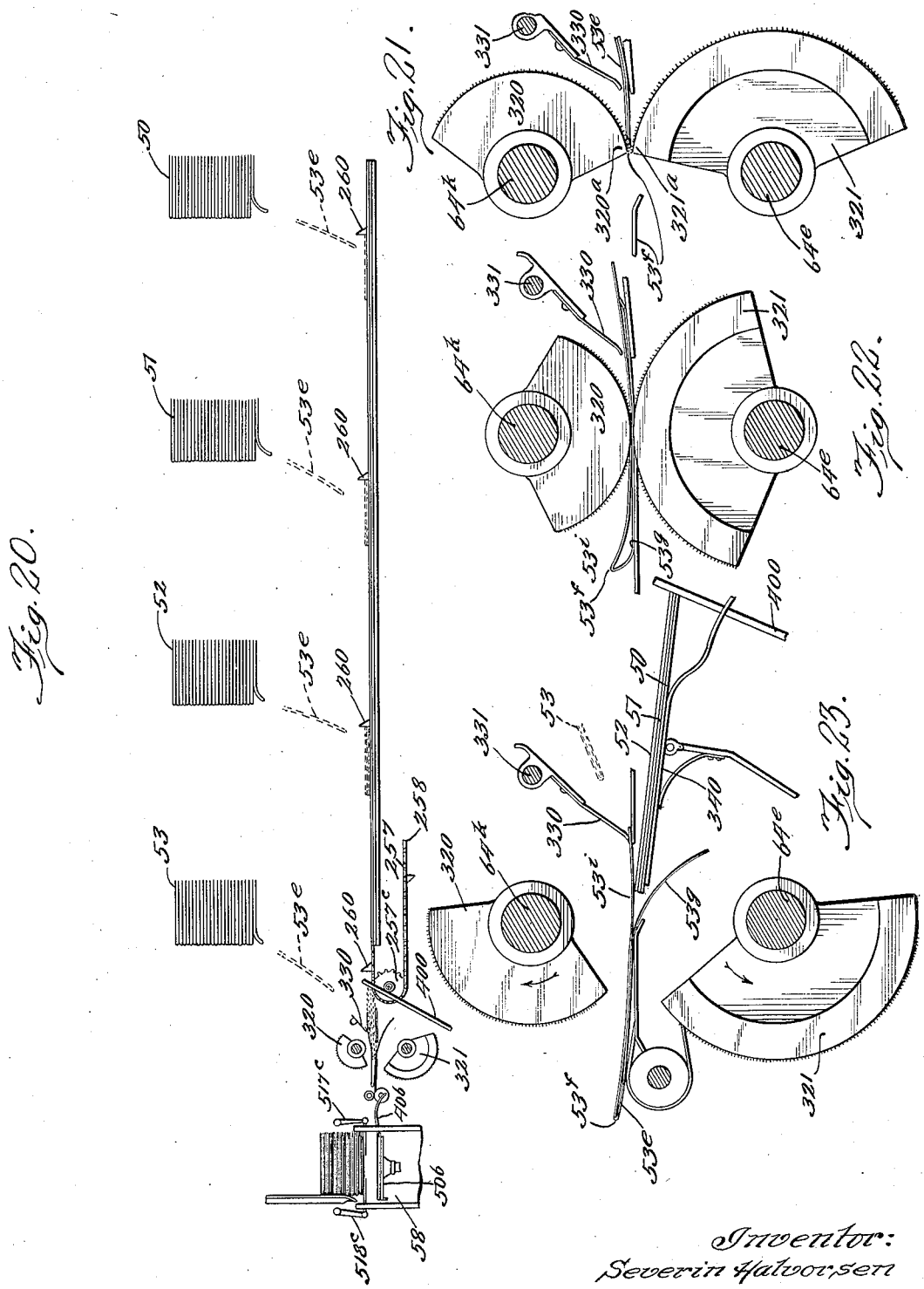
Inventor:
Severin Halvorsen
By A. Miller Belfield Atty.

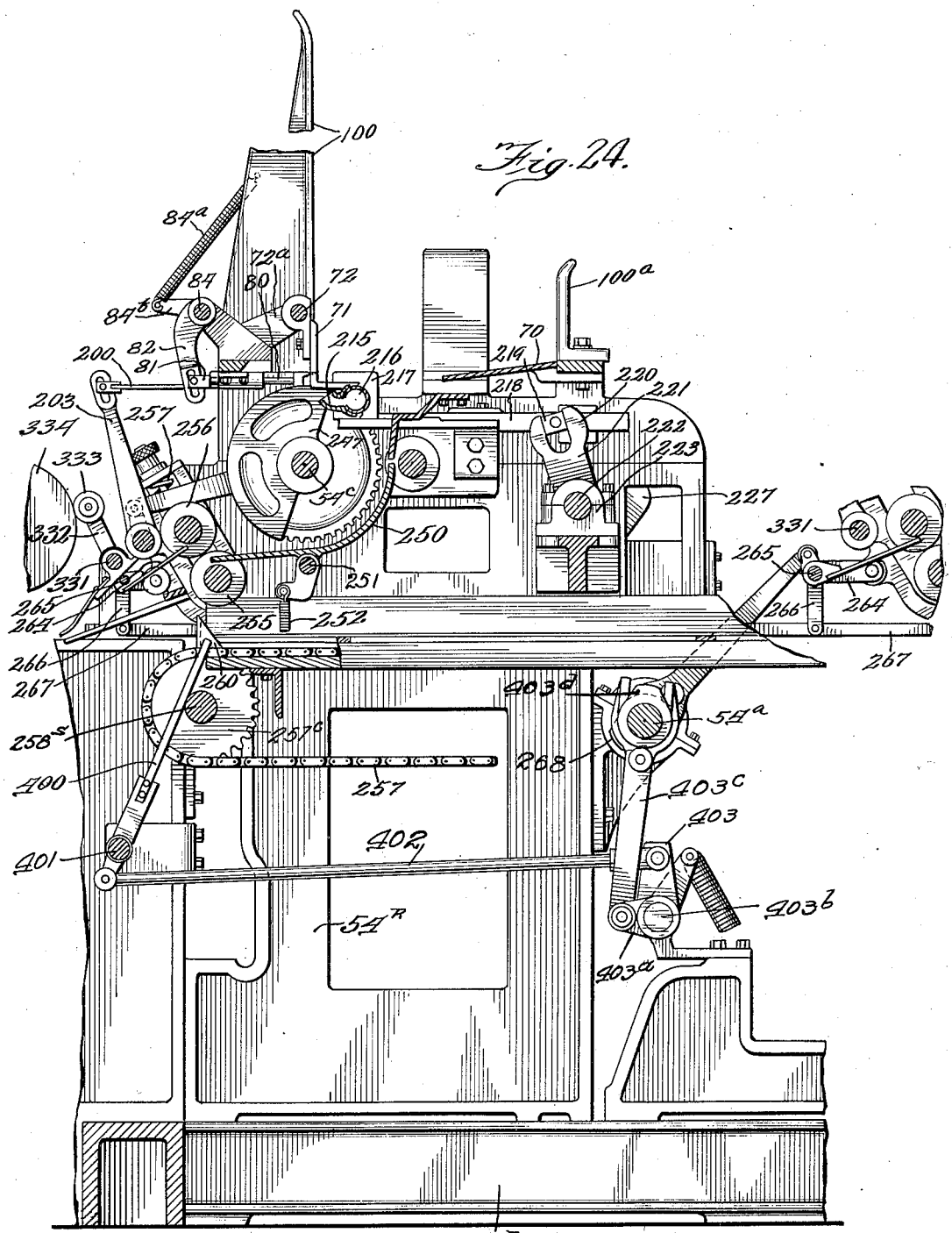

Nov. 19, 1935.   S. HALVORSEN   2,021,360
STUFFING MACHINE
Filed June 12, 1929   22 Sheets-Sheet 22
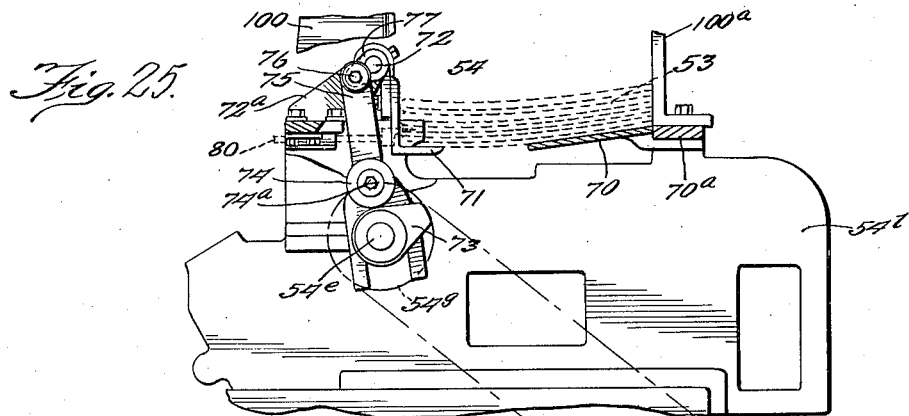
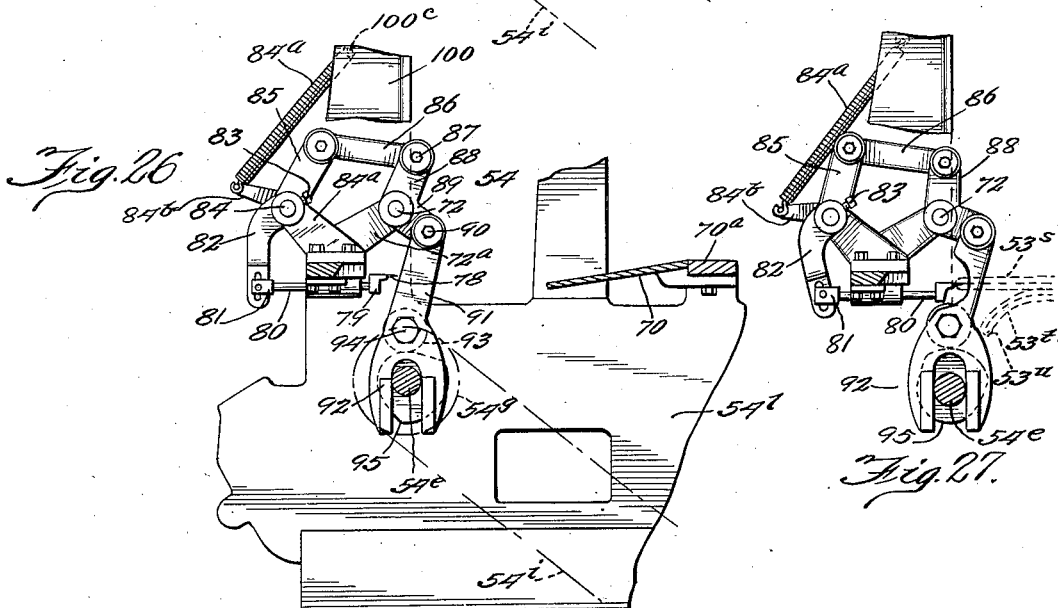
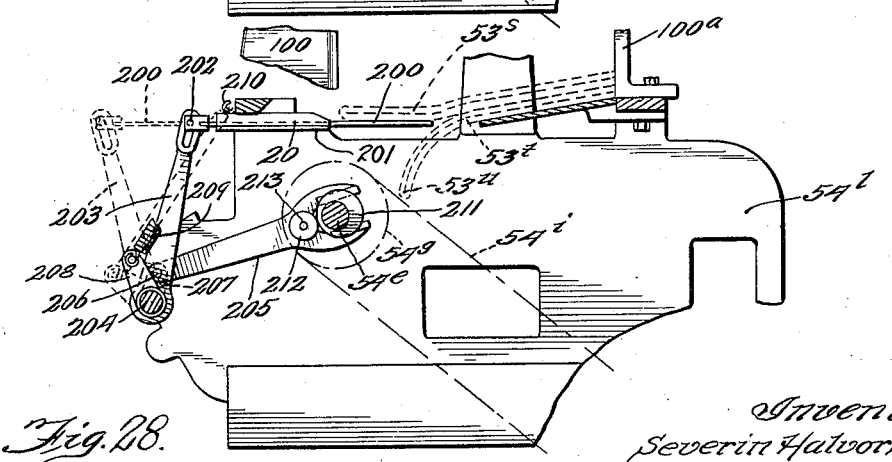
Inventor:
Severin Halvorsen
By A. Miller Belfield
Atty.

Patented Nov. 19, 1935

2,021,360

UNITED STATES PATENT OFFICE 2,021,360

STUFFING MACHINE

Severin Halvorsen, Chicago, Ill., assignor to The Newspaper Stuffing Machine Company, Seattle, Wash., a corporation of Washington Application June 12, 1929, Serial No. 370,244

125 Claims. (Cl. 270—55)

My invention relates to a newspaper stuffing machine, by which is meant a machine for assembling or stuffing newspapers.

One of the objects of the invention is to provide a practical and advantageous machine for the purpose.

Another object of the invention is to secure efficiency, effectiveness and speed in machines of this character.

Another object of the invention is to avoid crumpling the papers or sections in the stuffing process, to prevent jams and clogging the machine and so interfering with or stopping the whole process.

Another object of the invention is to permit the effective handling of paper sections of various kinds of paper, thin, medium, filmy, thick and so on, and particularly to prevent trouble when thin and filmy paper is used.

Another object of the invention is to permit or secure effective operation with different forms of cover sections, so that for example picture sections, funnies, rotogravures or other sections may be used for covers, and also to allow cover sections of different size to be used.

Other objects of the invention are to secure the foregoing and other useful ends in a simple and expeditious manner.

In the drawings:—

Figs. 1 and 2, comprise a top plan view of the machine.

Figure 3:
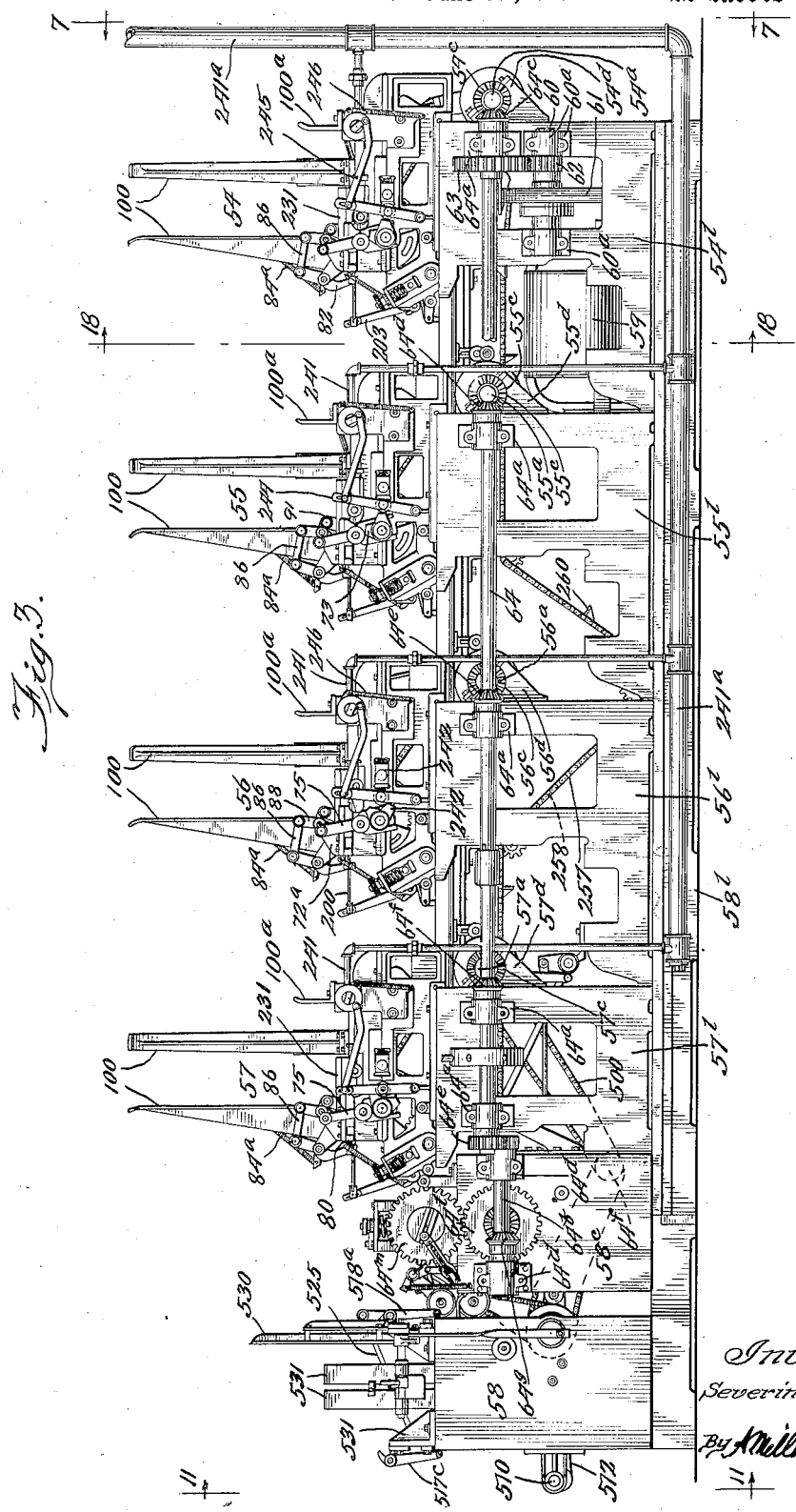
Fig. 3 is an elevation of the left hand side of the entire machine.
Figure 5:
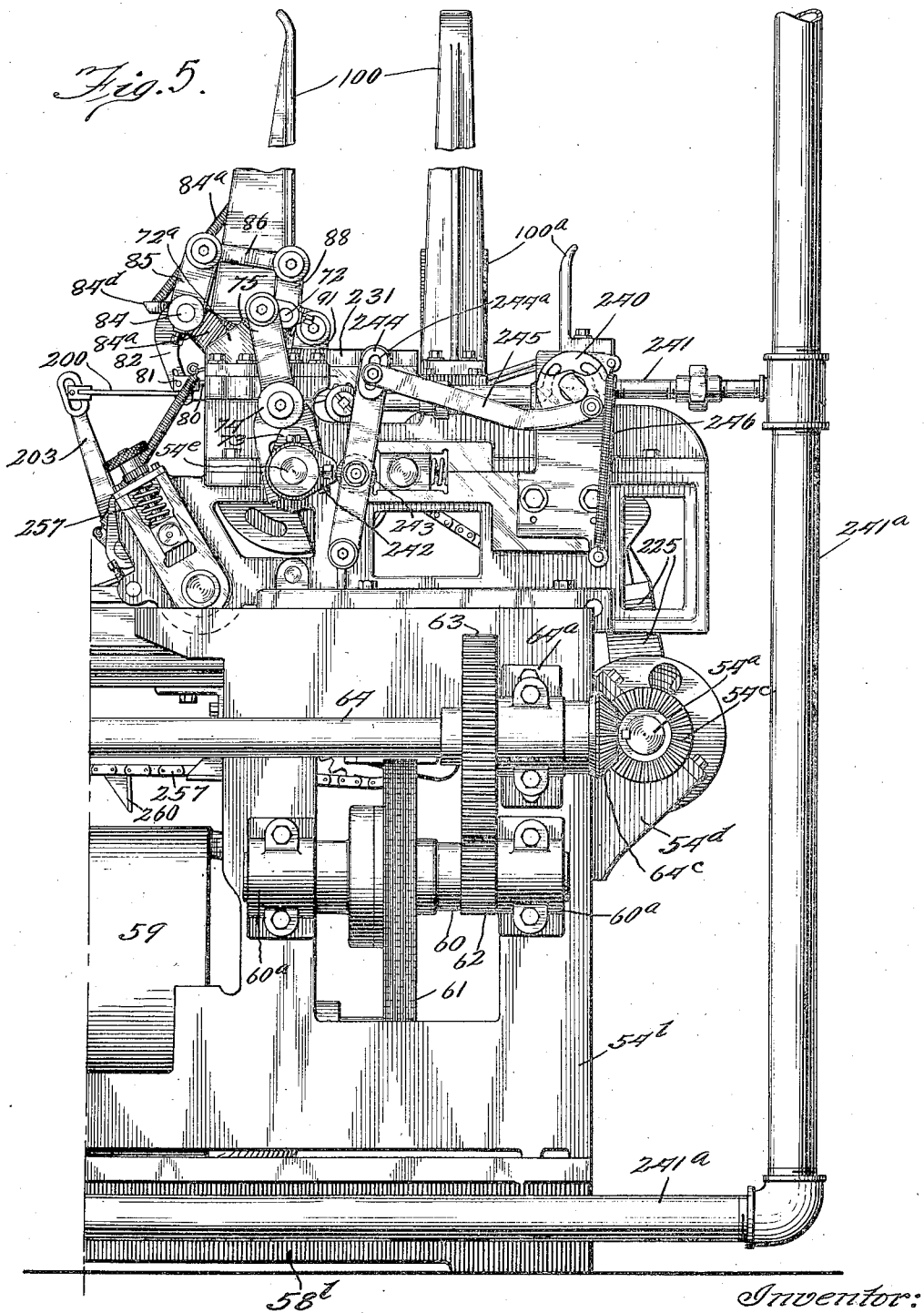
Figure 6:
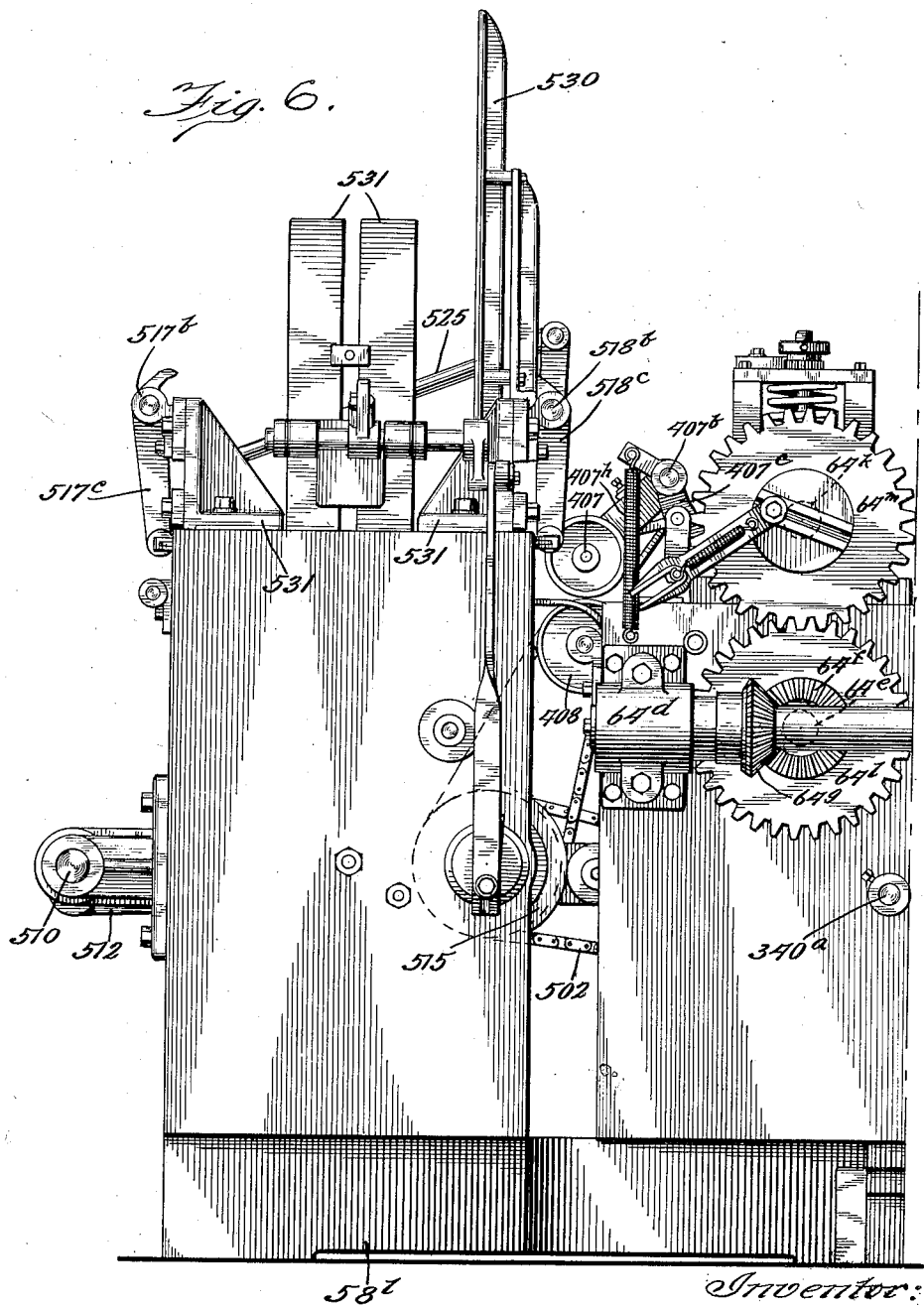

Figs. 5 and 6 comprise a view in elevation of the left hand side, similar to Fig. 3 but drawn on a larger scale.

Figure 7:
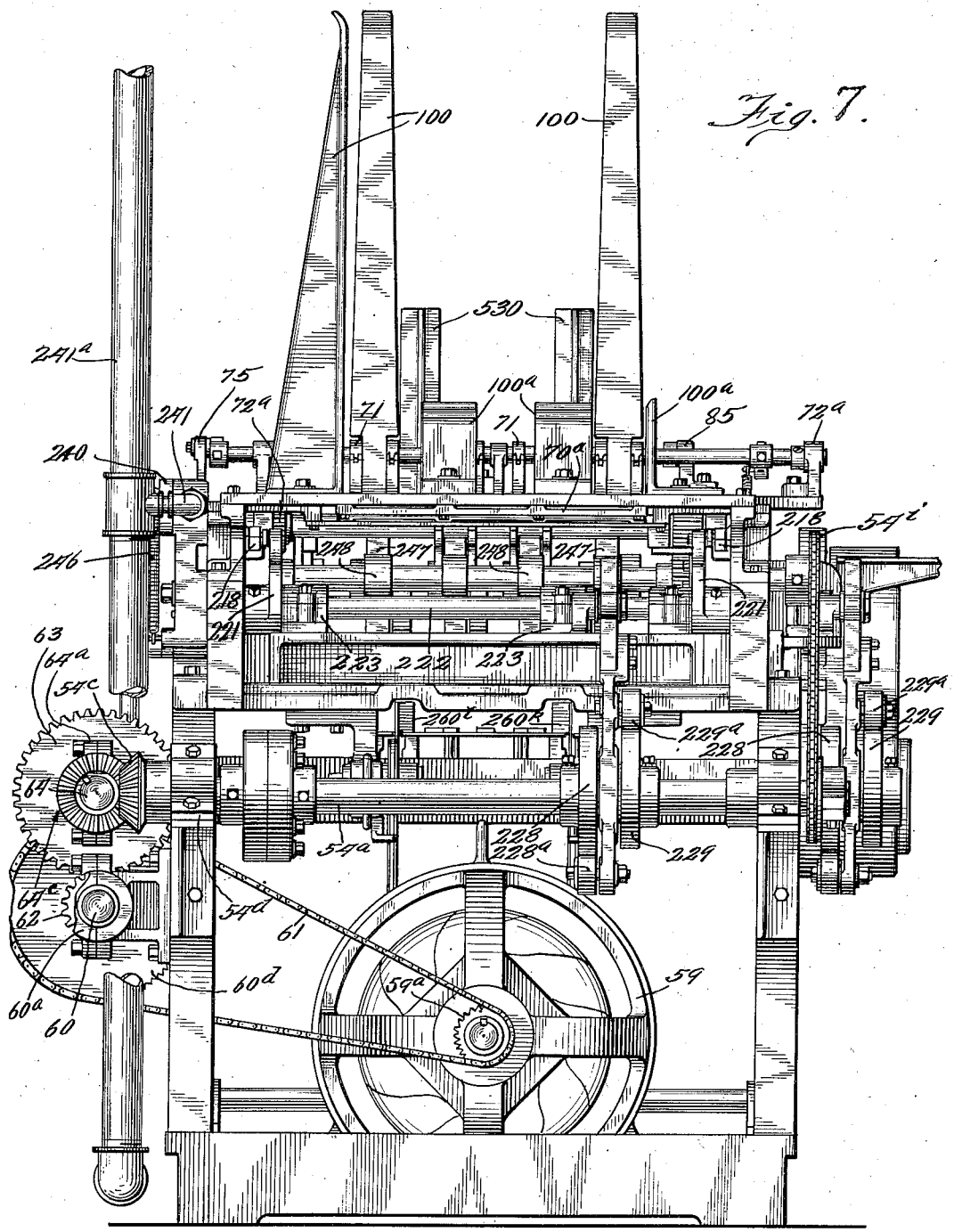

Fig. 7 is an elevation of one end of the machine, looking toward the delivery end.

Figure 8:
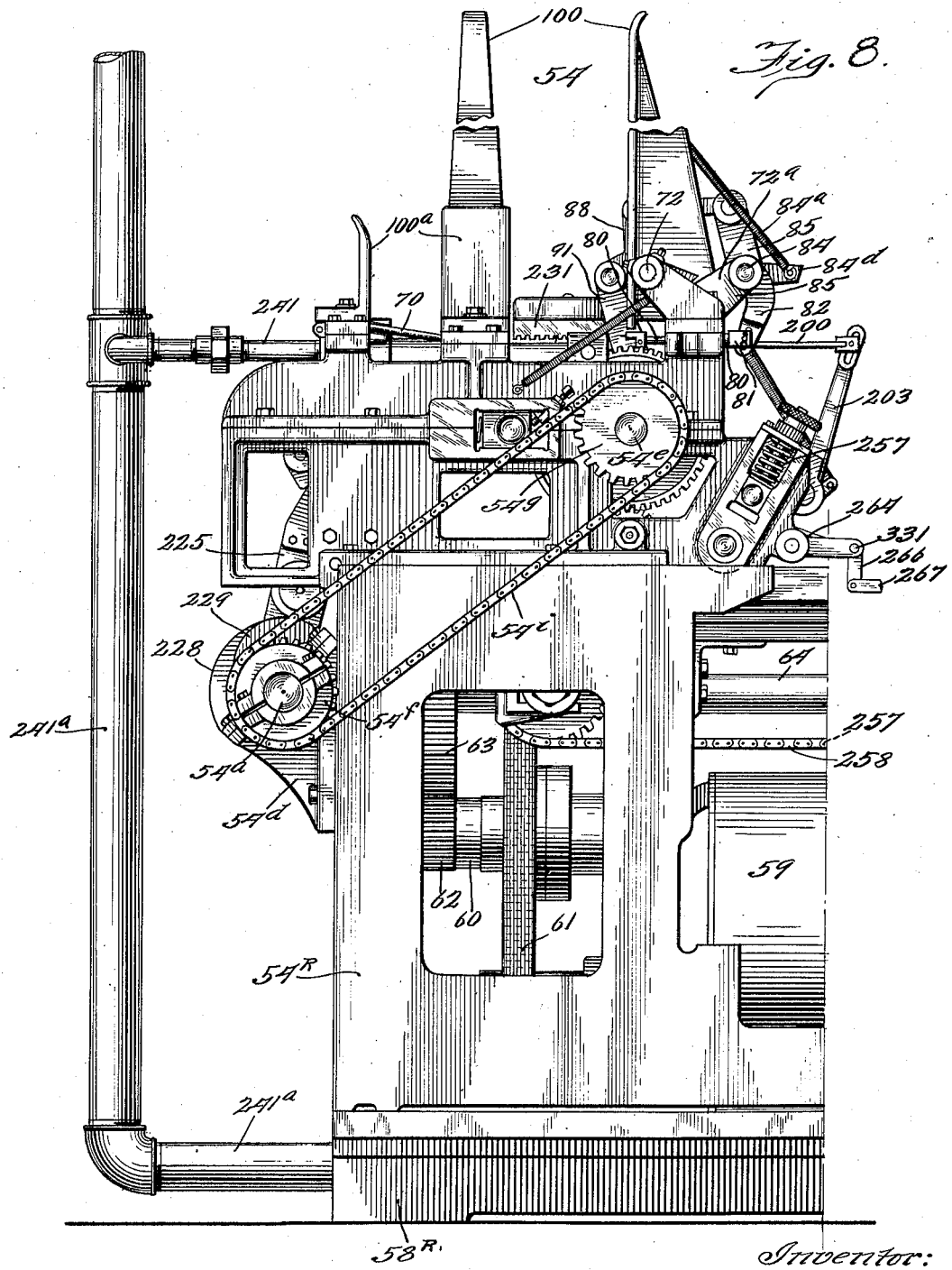
Figure 9:
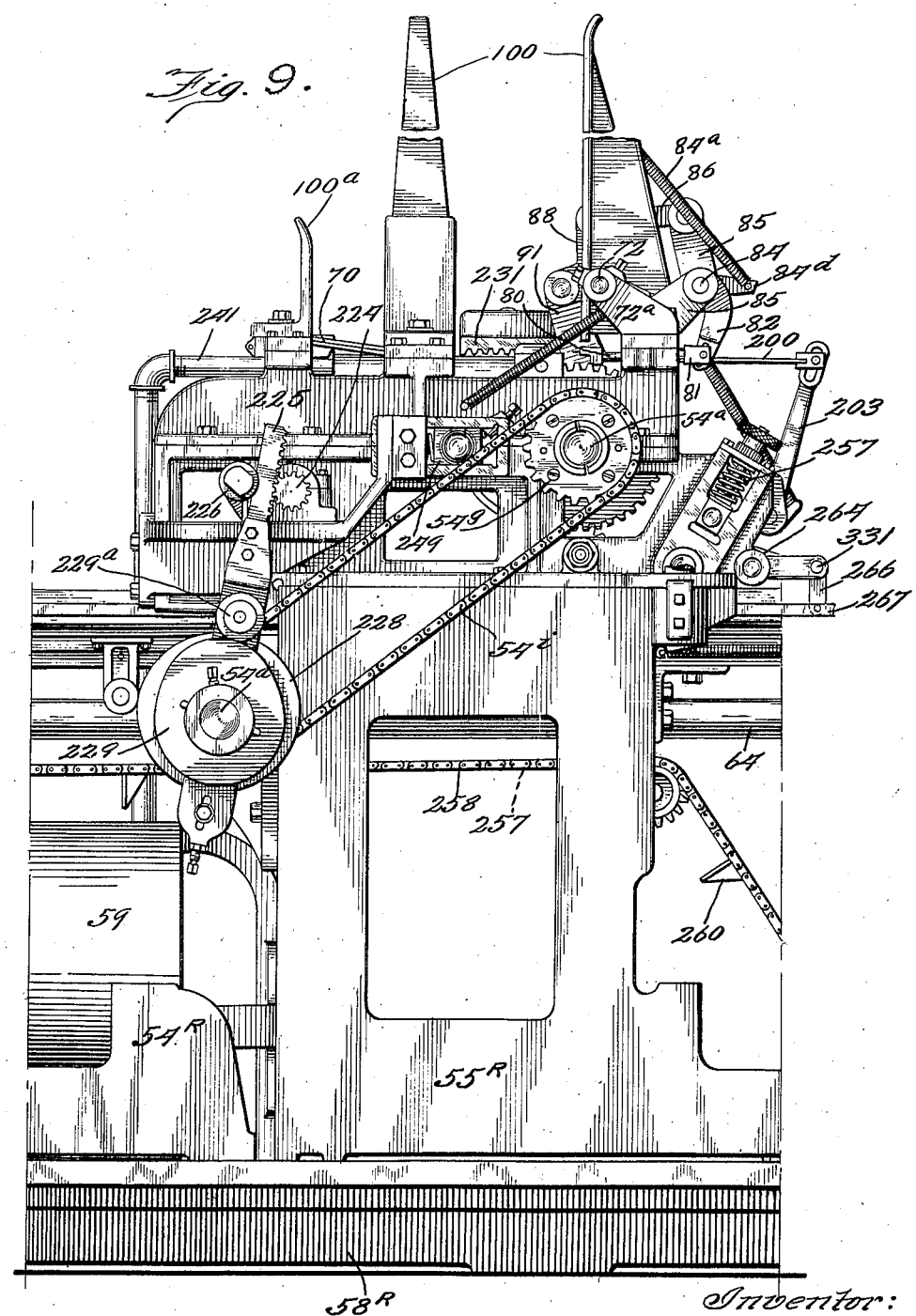
Figure 10:
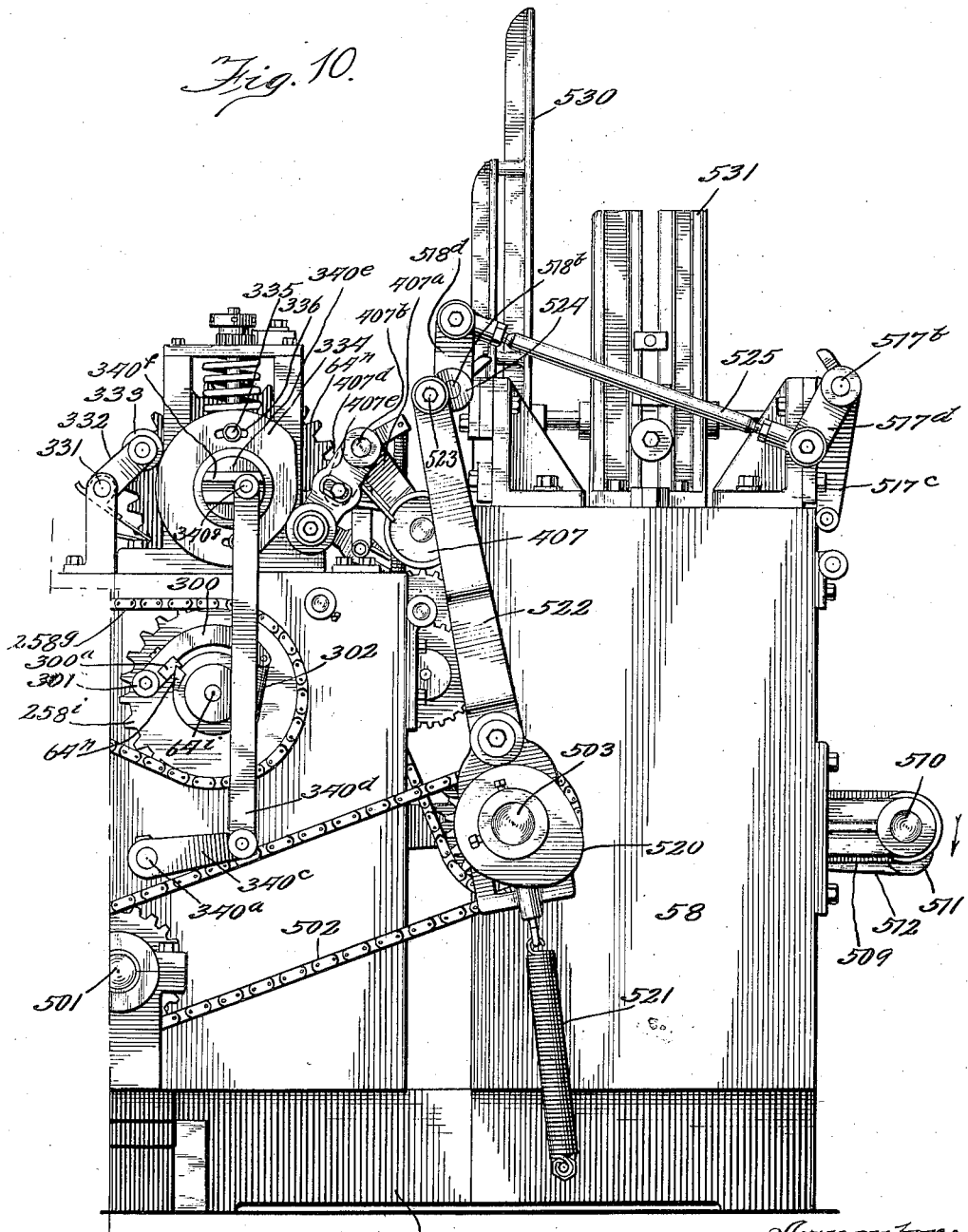

Figs. 8, 9 and 10 comprise a view in elevation of the right hand side similar to Fig. 7, but drawn on a larger scale.

Figure 11:
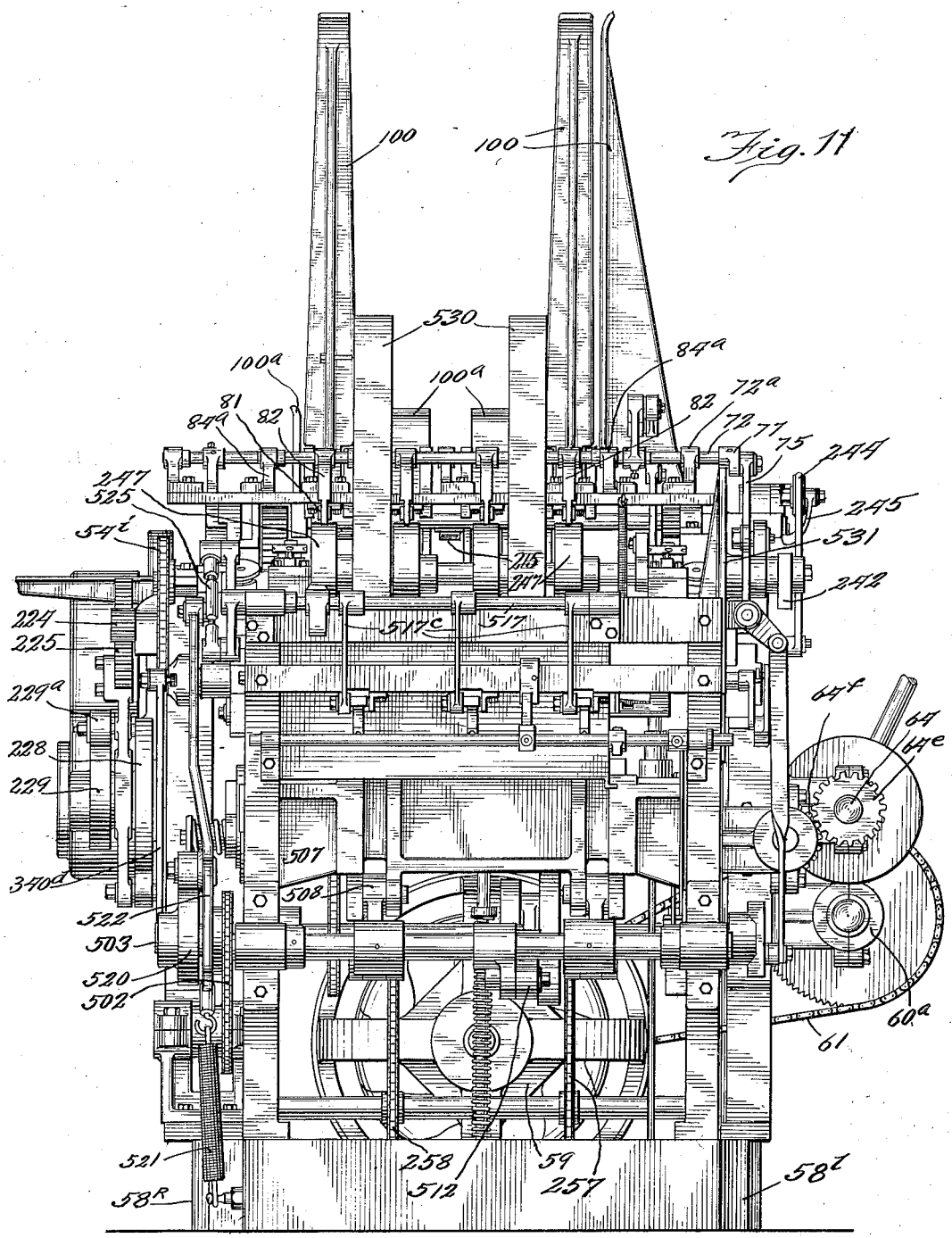

Fig. 11 is an end elevation of the machine as viewed from the delivery end.

Figure 12:
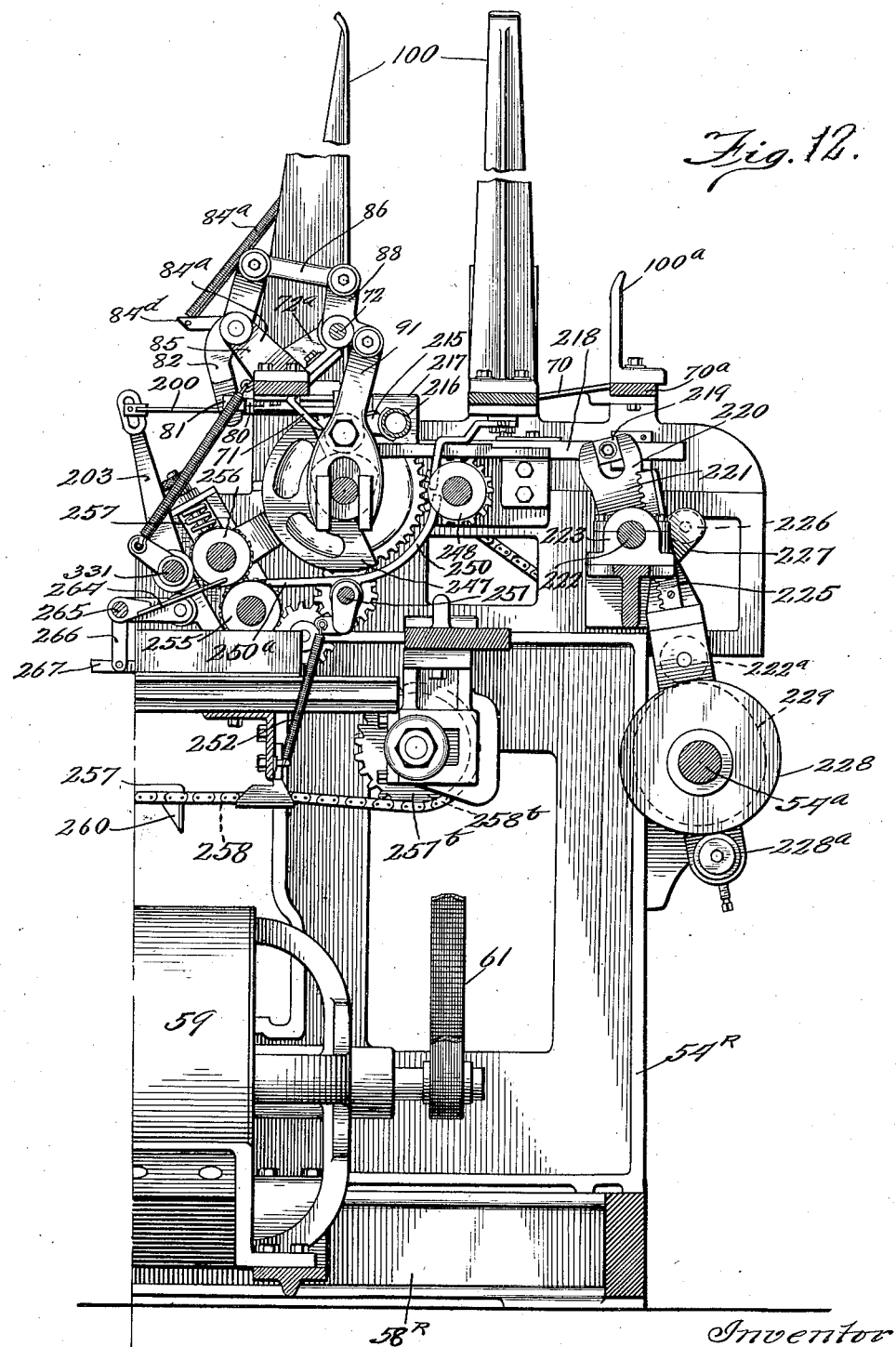
Figure 13:
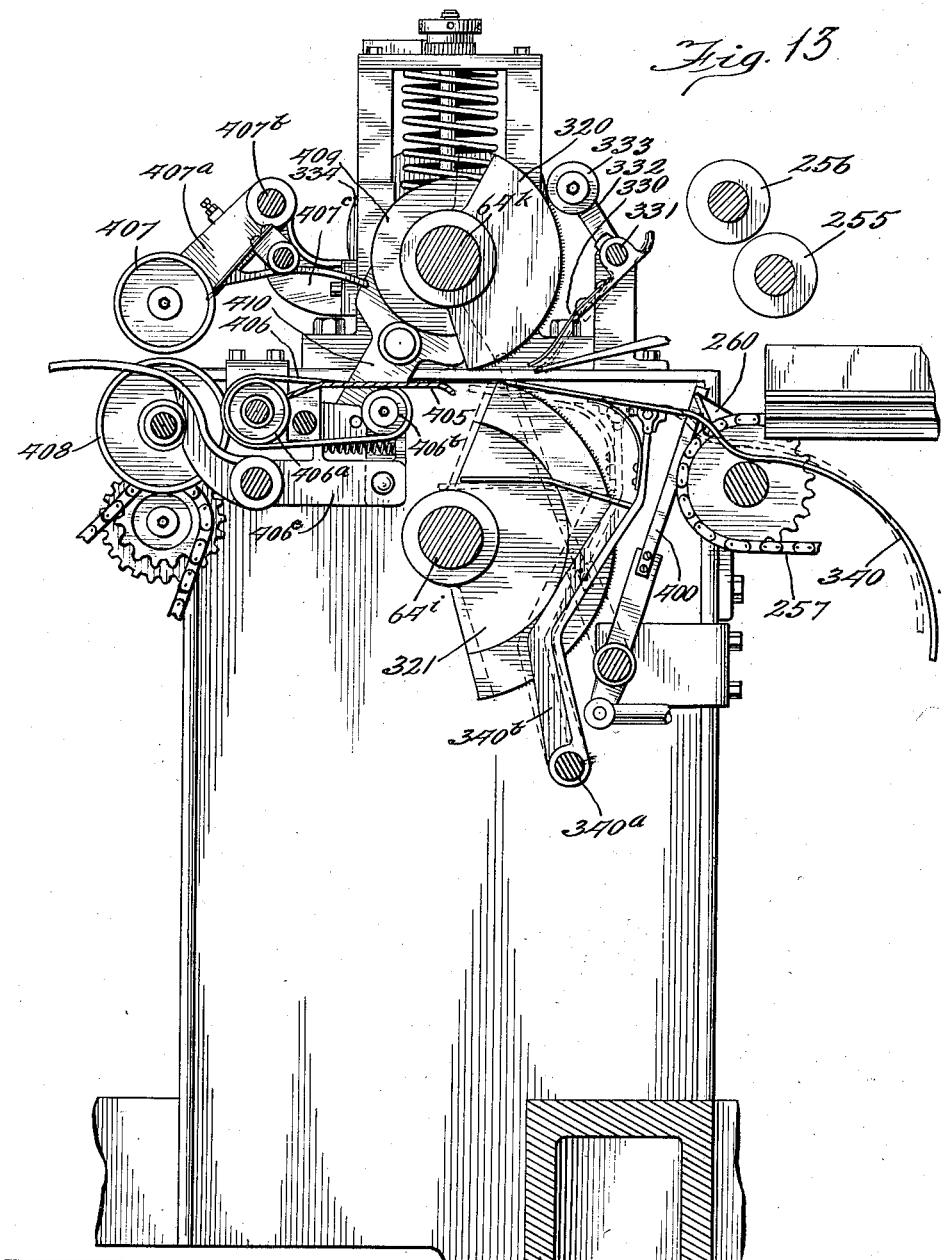

Figs. 12 and 13 comprise an elevation of the left hand side of the machine having the main frame removed, with parts in section to disclose certain features of construction.

Figure 14:
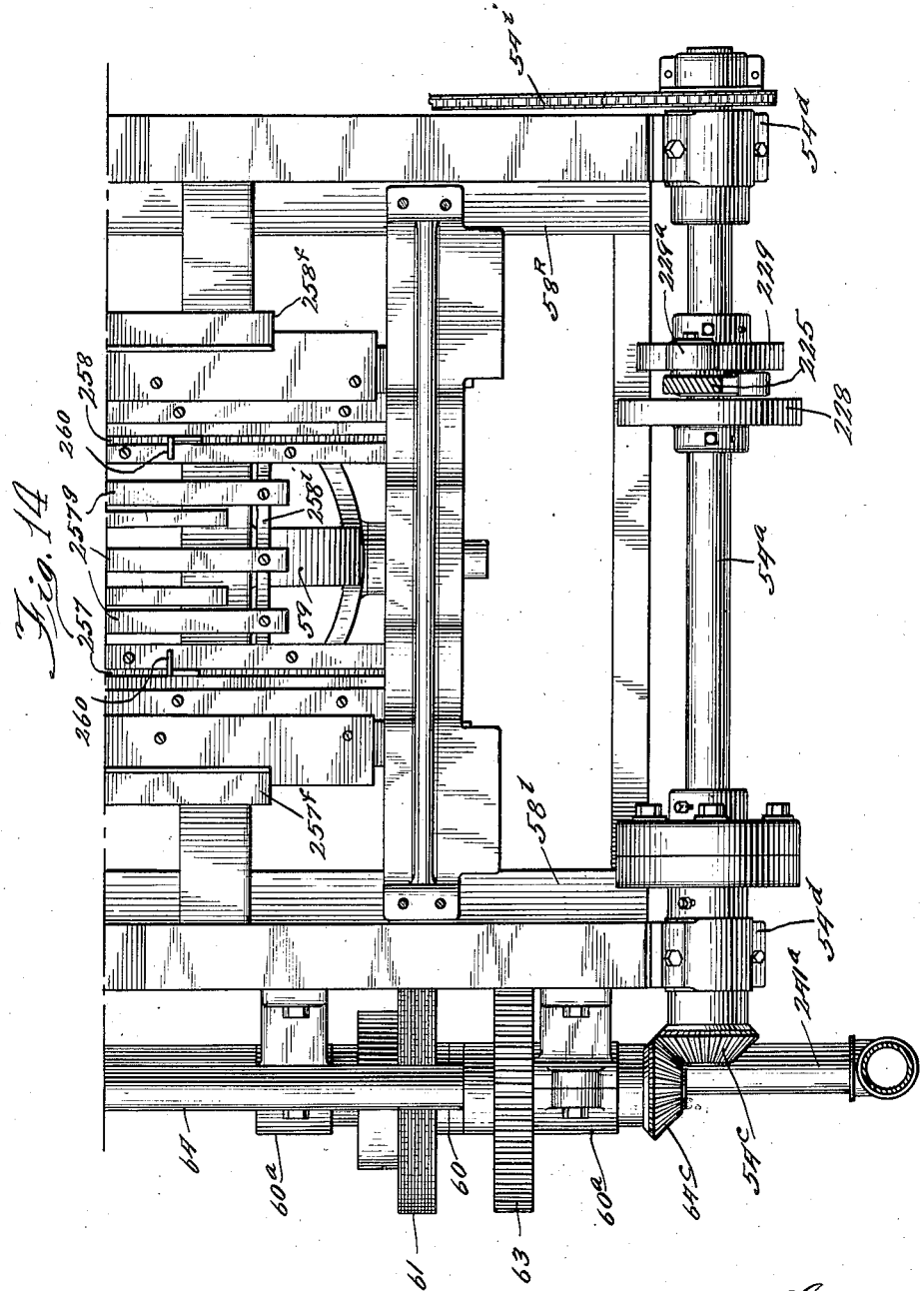
Figure 15:
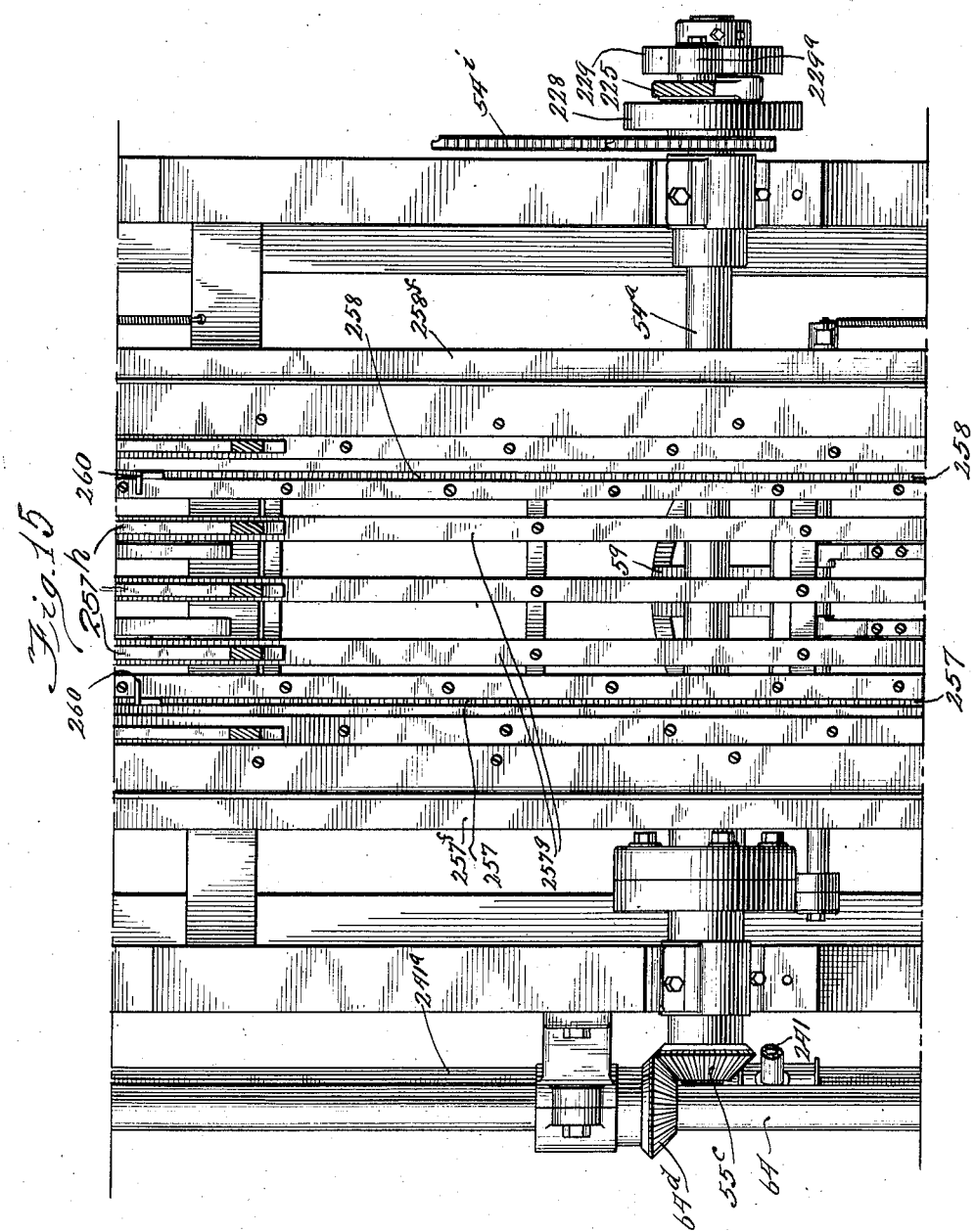
Figure 16:
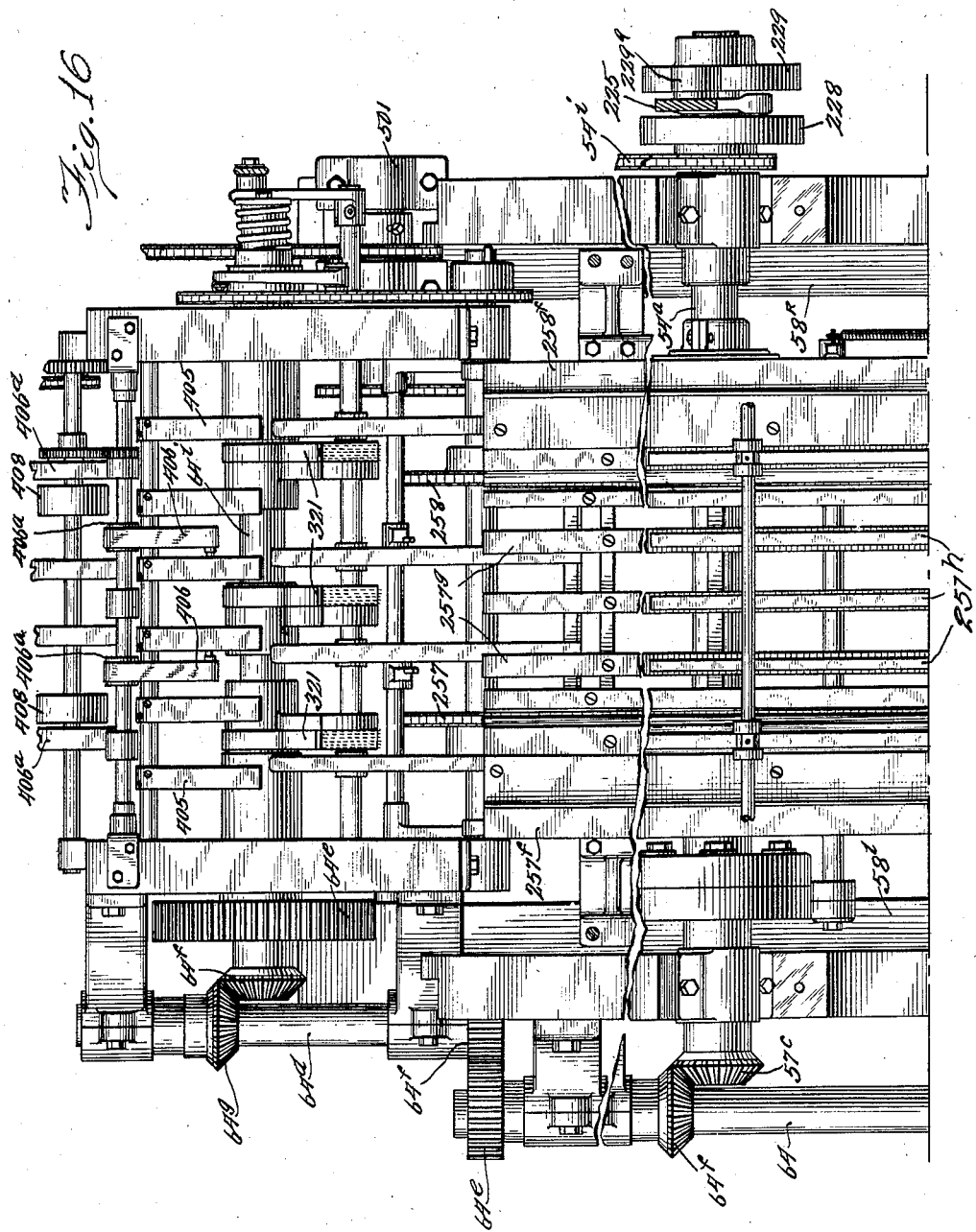

Figs. 14, 15 and 16 comprise a plan view with parts removed to show the conveyor-way and to disclose certain other parts associated therewith.

Figure 1:
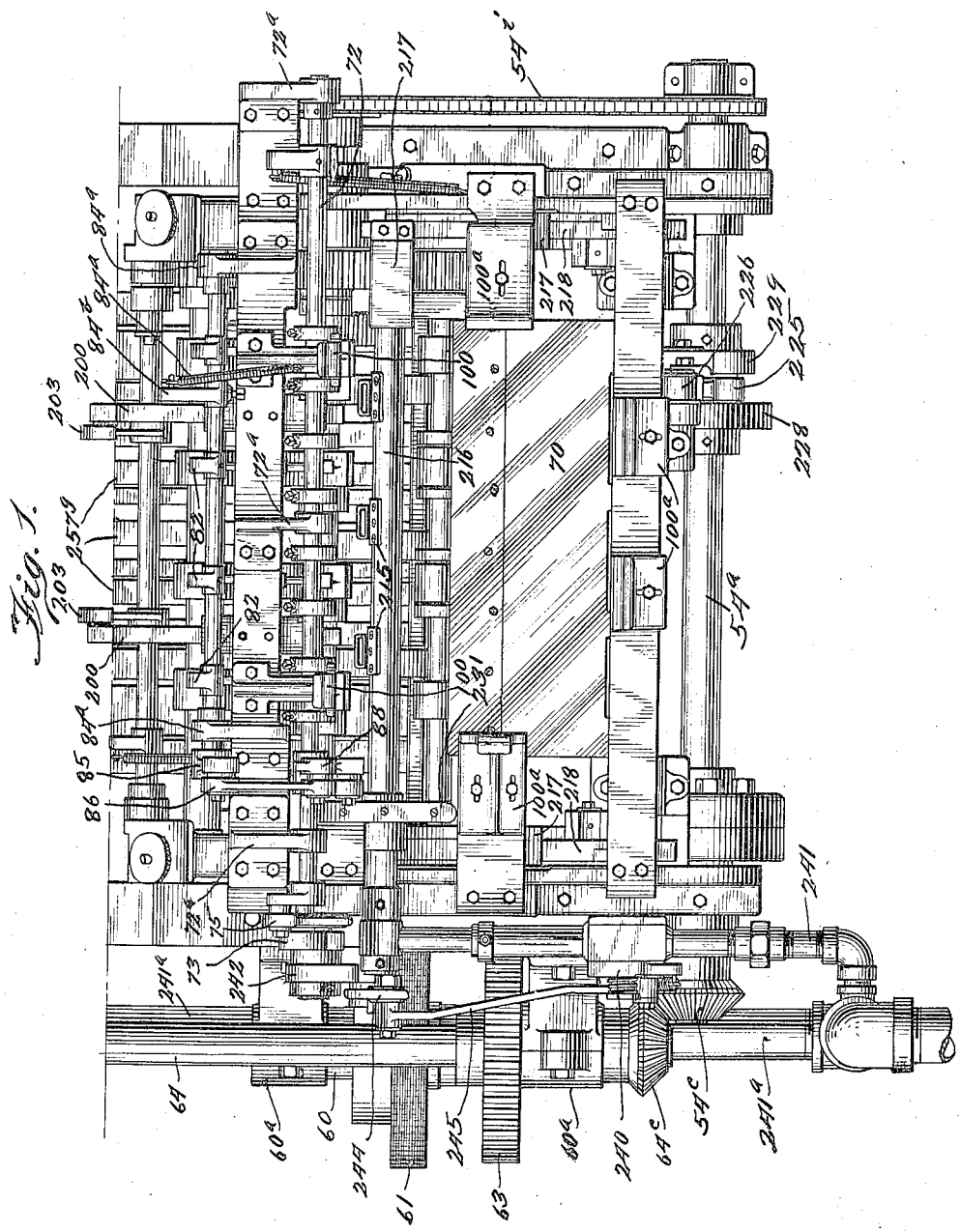
Figure 2:
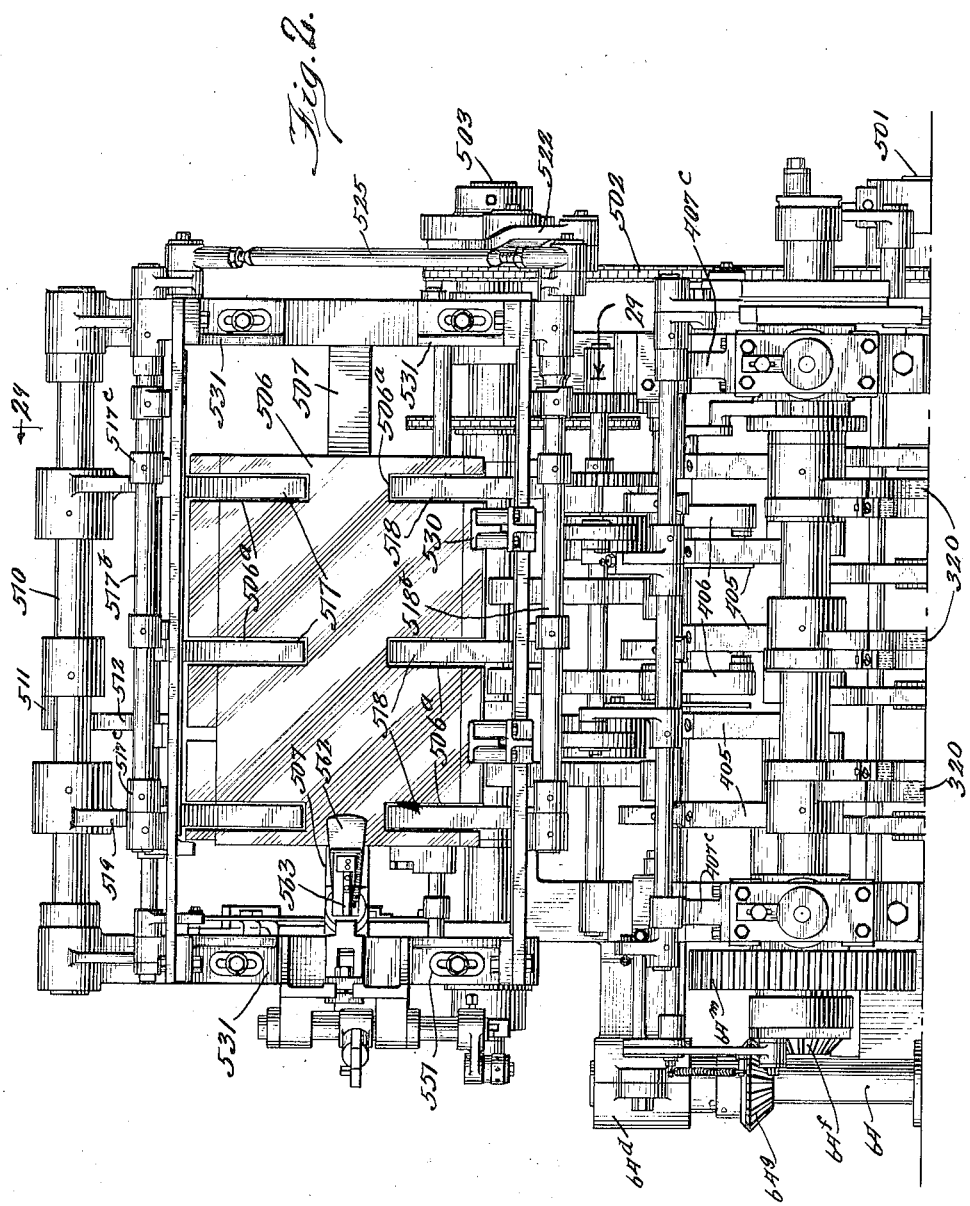
Figure 17:
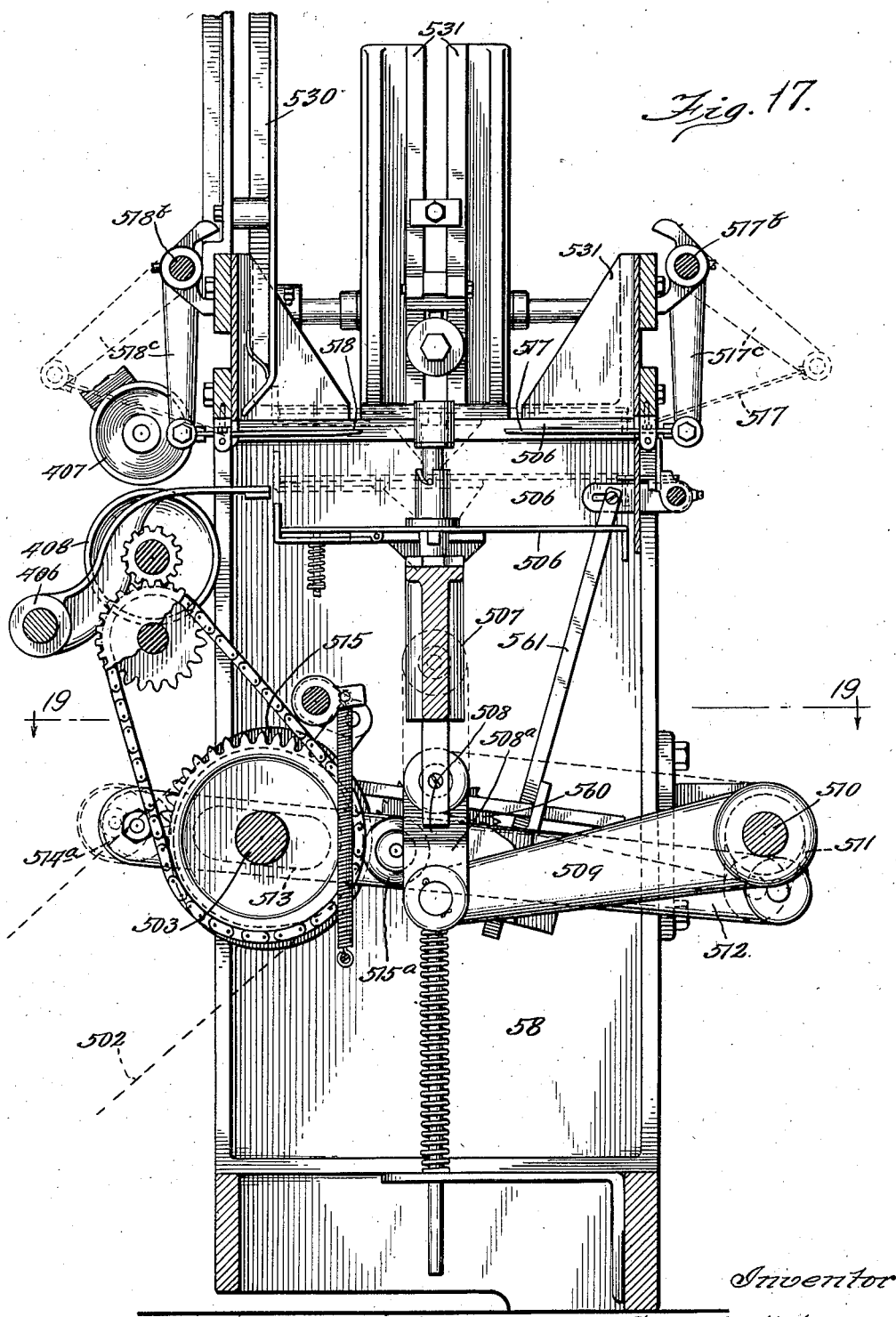

Fig. 17 is a view taken at the line 17—17 on Fig. 2 looking in the direction indicated thereon.

Figure 4:
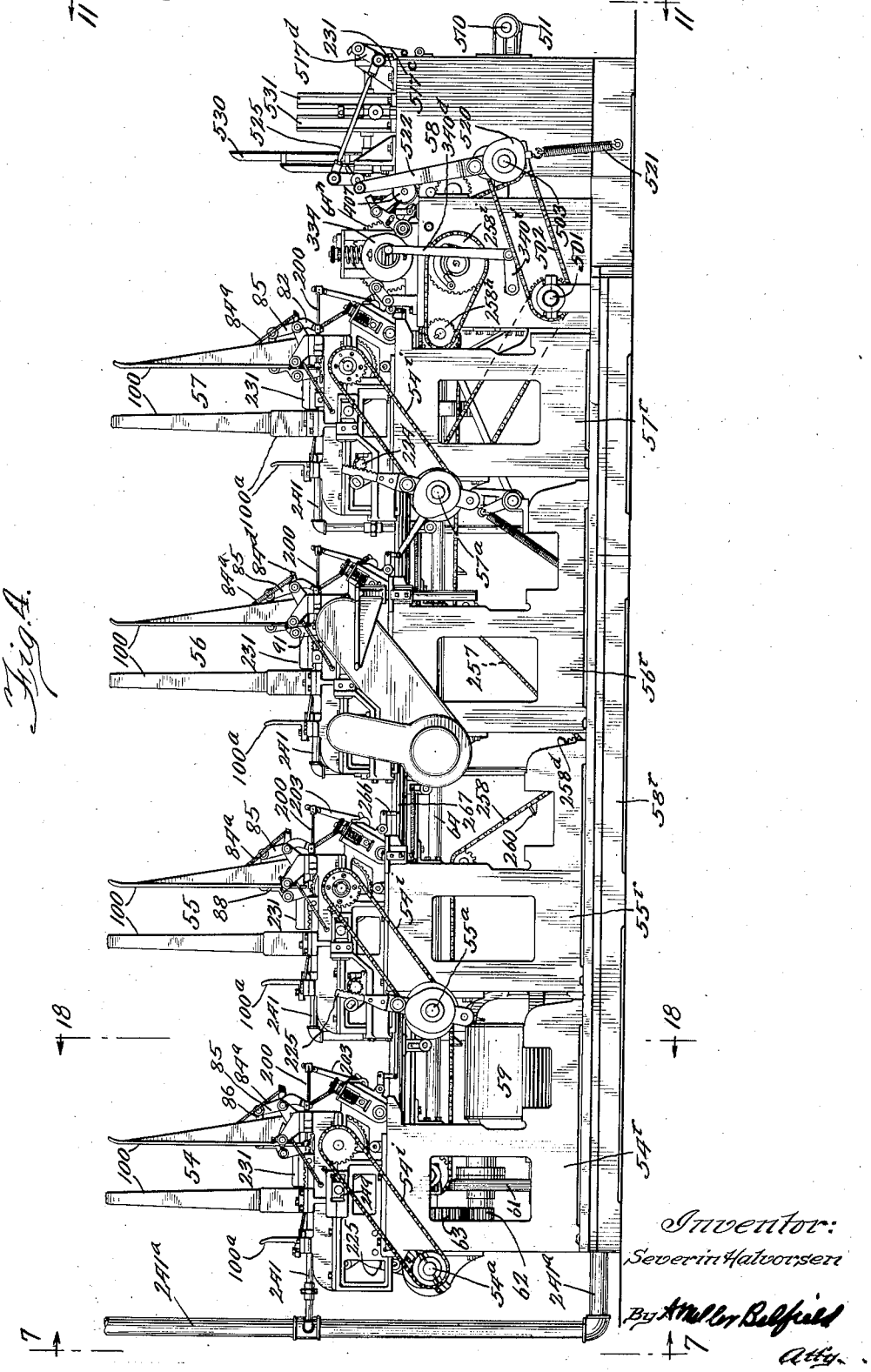
Fig. 4 is an elevation of the right hand or opposite side of the machine.
Figure 18:
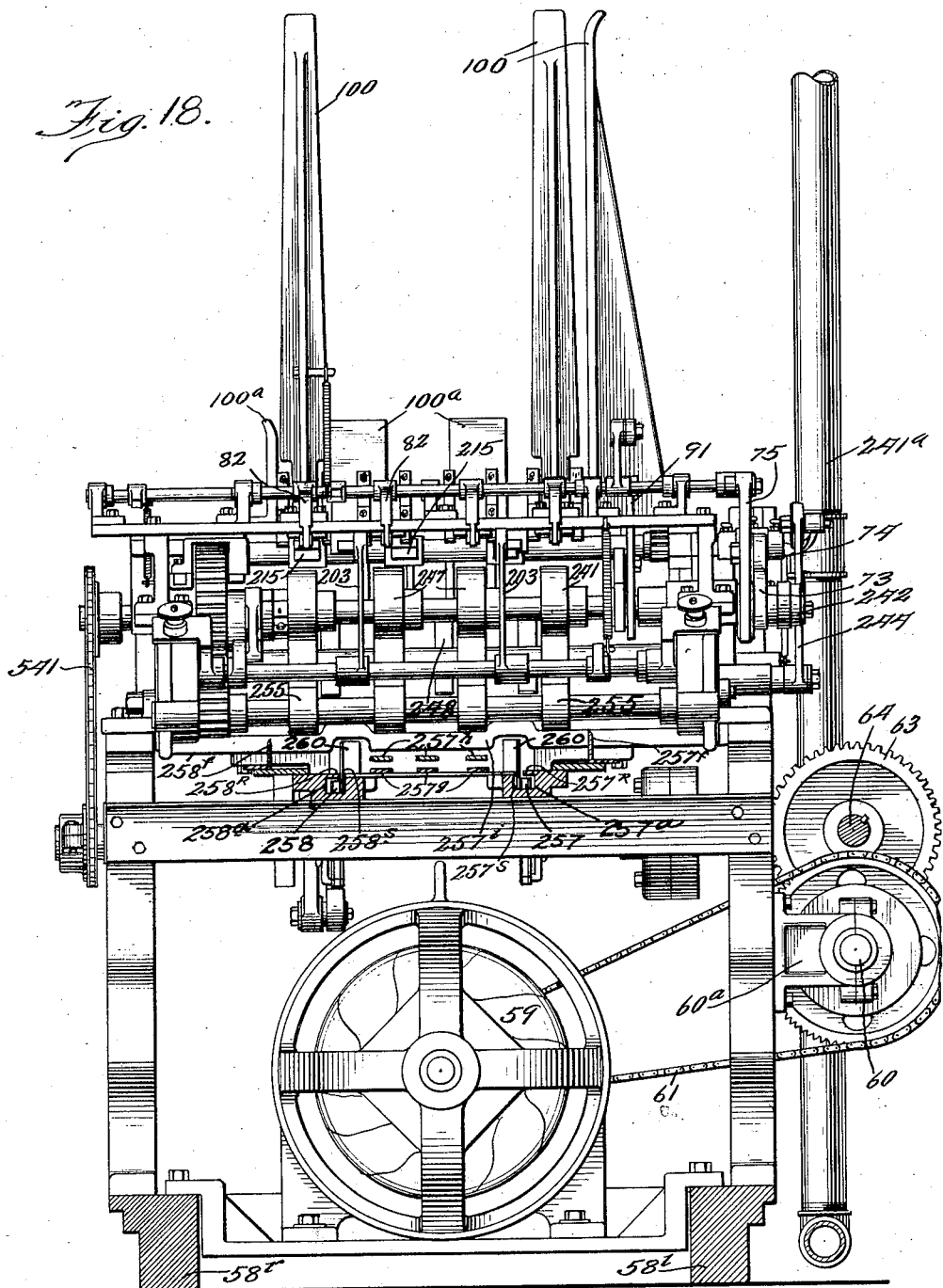

Fig. 18 is a section taken at the line 18—18 on Fig. 4.

Figure 19:
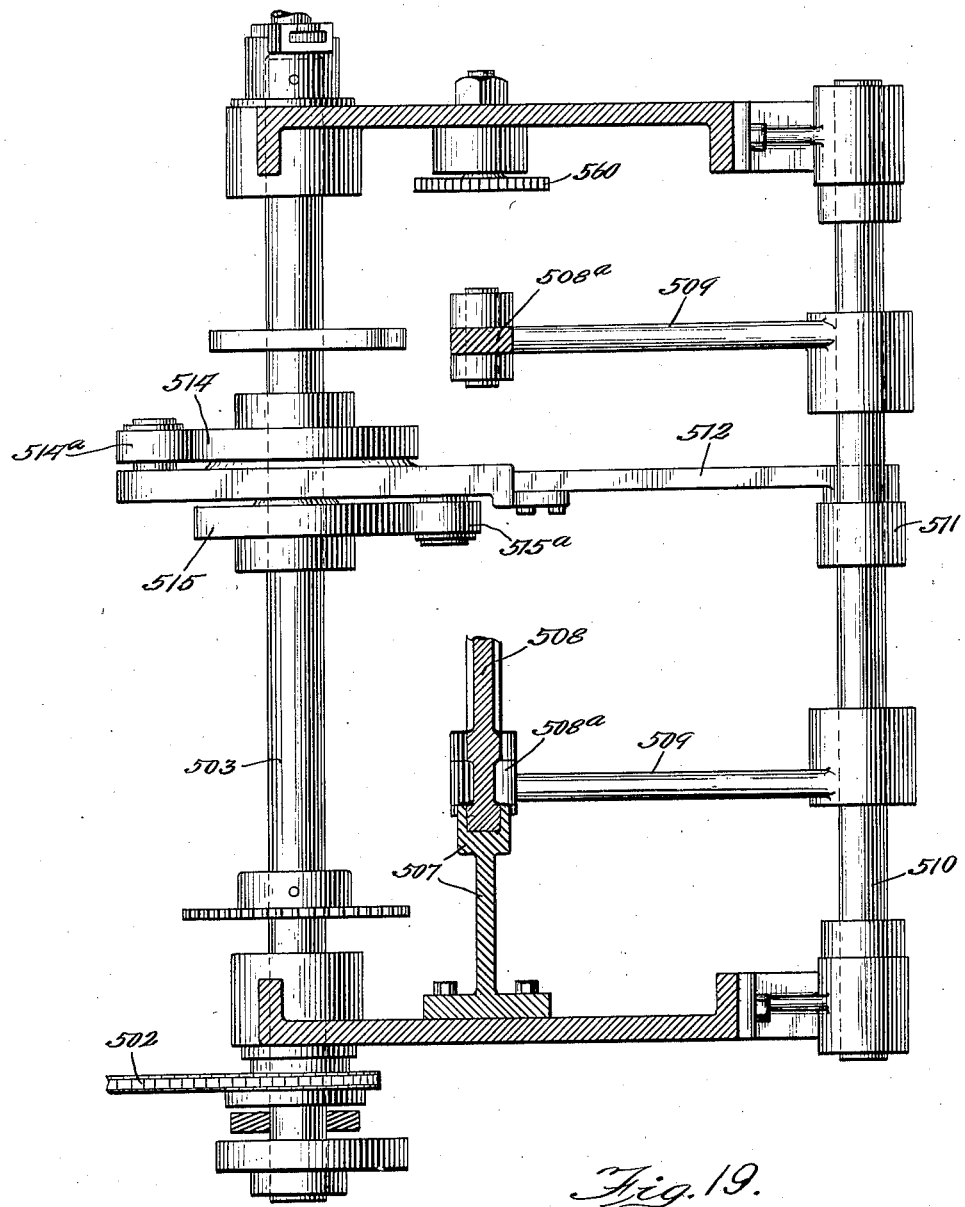

Fig. 19 is a view taken at the line 19—19 on Fig. 17, having certain parts removed and other parts in section.

Fig. 20 is a diagrammatic view indicating the operation of the machine.

Fig. 21 is a diagrammatic detail of the parts which serve to open the cover section of the paper.

Fig. 22 is a view similar to Fig. 21 but with the parts advanced.

Fig. 23 is a view similar to Fig. 21, with the parts further advanced.

Fig. 24 is a vertical section through one of the heads at a plane near the longitudinal medial line thereof.

Fig. 25 is a detail view of the movable paper-separating device and the operating mechanism thereof.

Fig. 26 is a detail view of the paper-separating device and the operating mechanism therefor.

Fig. 27 is a detail view of the paper separating device, the parts in a changed position.

Fig. 28 is a detail view of the paper stripping device and the operating mechanism therefor.

In the drawings, having particular reference to Figs. 3, 4 and 20, is shown a machine of the character referred to, in which are four stacks, 50—51—52 and 53 of newspaper sections (see Fig. 20) as taken from the printing press; Figs. 3 and 4 show four heads or magazines 54—55—56 and 57 for receiving the stacks of newspaper sections which are to be assembled to form a unit ready for delivery.

It is obvious that the number of heads shown may vary, but the number shown will suffice for purposes of illustration.

Be it understood that the head 57 contains the stack 53, which is to form the cover or outside part, and the sections 50—51 and 52 in the magazines or heads 54—55 and 56 respectively are to be gathered and placed one over the other to form a pile containing one section from each of the sections 50—51 and 52, which are then to be inserted in one of the sections taken from the stack 53, and then to be passed on to the delivery device at 58, all of which will be hereinafter more fully described.

The several magazines or heads 54—55—56 and 57 are each mounted and supported on and by the side frame members $54^r$ to $57^r$ and $54^l$ to $57^l$ respectively, which are tied together by the base members $58^r$ and $58^l$.

Power is supplied to operate the several movable parts by a motor 59 which drives a jackshaft 60 through a chain belt 61 which runs over a sprocket wheel 59a secured to the motor shaft, and a sprocket wheel 60d on the shaft 60. The shaft 60 is supported in journal boxes 60a—60a which are bolted to the frame member 54l. The meshed spur wheels 62 and 63 transmit power and motion from the shaft 60 to the shaft 64 which extends along the side of the frames 54l to 57l and is journalled in bearing boxes 64a; this shaft 64 transmits power to a shaft 64b mounted paraxially therewith but offset therefrom and mounted on the frame 58c in journals 64d, power thereto being transmitted by the spur gears 64e and 64f.

The shaft 64 distributes power to each of the several heads, 54 to 57 by means of the transverse shafts 54a 55a 56a and 57a which have keyed thereto the intermeshing bevel gears 64c–d–e–f, on the shaft 64 and the gears 54c to 57c keyed to the transverse shafts 54a to 57a respectively.

The transverse shafts 54a to 57a are journalled in bracket box 54d to 57d which are secured to the side frame members 54r to 57r and 54l to 57l and extend to the opposite side of the machine (see Figs. 4, 8 and 9) for driving the shafts 54e to 57e through the medium of the sprocket wheels 54f to 57f on the shafts 54a to 57a, the sprockets 54g to 57g and the sprocket chains 54i to 57i.

The shaft 64b transmits power through the bevel gears 64g—64f to a cross shaft 64j. Another shaft 64k parallel to, and above shaft 64j, is connected thereto by the spur gears 64l and 64m. The functions of these various power media will be disclosed as the operation of the machine is described.

In Figs. 25, 26, 27 and 28 is shown more or less diagrammatically the devices (which are common to each of the heads) for supporting a stack of sections and separating or withdrawing one section from the bottom thereof and conveying that section to its proper relative position to a section of the next stack.

The stationary inclined shelf 70 is secured to a cross bar 70a and supports one side of the stack 53 and the movable ledge, composed of a multiplicity of ledge fingers 71, supports the other side, which in this case is the folded edge of the sections. The standards 100 and 100a assist in keeping the pile or stack of sections in proper position; they are stationarily secured to and mounted on the frame members 54r and 54l and are so positioned and located as to contact the boundary of the stacks.

The fingers of the ledge 71 are keyed to a shaft 72 and mounted for rocking out and away from a supporting position (see Figs. 12 and 25); these fingers being similar in each of the heads and operated in a like manner the description of one set in one of the heads (head 54 for instance) will suffice.

The rocking movement of the shaft 72 is imparted thereto by the shaft 54e through the medium of the following device. A cam 73 keyed to the shaft 54e contacts a roller 74 which is mounted by means of a stud at 74a on a fork-shaped thrust link 75; this thrust link is connected at 76 to a crank arm 77, which is set-screwed to the shaft 72.

Just as the fingers 71 are about to be rocked away from supporting position an auxiliary supporting device is brought into action. This consists of a set of needles 78, mounted in a block 79 and secured to the end of a rod 80 mounted for reciprocation; each of the rods 80 terminates in a rod-head 81 which is pivoted in a slotted arm 82; the arms 82 are secured as by the set-screws 83 to a rock shaft 84 which is journalled in brackets 84a.

Rigidly secured to the shaft 84 is a crank-arm 85 connected by means of the link 86 to a bell-crank lever at 87. This bell-crank lever is loosely mounted on the shaft 72 for movement independent thereof. The arm 88 which is pivoted at 87 to the member 86 maintains substantially a parallel position to the member 85. The second arm 89 of the bell-crank lever is pivoted at 90 to, and is actuated by the thrust link 91 mounted with its forked end 92 straddling the shaft 54e. A roller 93 pivoted at 94 to the member 91 is arranged to ride a cam 95 affixed to the shaft 54e; thus when the cam 95 and the mechanisms associated therewith are actuated for employing the needles 78, they are thrust or intruded into one of the paper sections of the stack. For retracting the needles, a spring 84a is attached at 100c and to a lever 84b which is keyed to the shaft 84. These needles 78 are located in plane somewhat above that of the ledge members 71, and preferably arranged to engage the paper sections 53s next to the bottom one 53t, thus leaving that side or edge of the bottom one unsupported, free and ready to be separated from the rest of the sections above it in the stack.

Before thus extracting the bottom section 53t, and to facilitate this extraction or withdrawal, means is provided for decreasing the friction between it and the contiguous section, due to the weight of the superposed sections.

The specific means here employed consists of the stripper bar or bars 200, mounted for reciprocation and riding in guides 201 secured to the side frame members 54r and 54l. Each bar is pivotally connected at 202 to a lever arm 203; these arms 203 are rigidly secured to a rock shaft 204 which is journalled in brackets integral with the frame 54r and 57l. A thrust link 205 is connected at 206 to a short crank-arm 207 secured to the shaft 204 to impart a rocking movement thereto; another crank-arm 208 is also secured to the shaft 204 and provides means for connecting a tension spring 209 which is anchored to the frame at 210. The spring 209 provides yielding means for advancing the stripper-bar 200, while the link 205 is arranged to retract this member 200 by action of a cam 211 keyed to the shaft 54e and a roller 212 trunnioned at 213 to the member 205.

While the needles 78 and the bars 200 are engaged in separating the paper stack and the members 71 are held in non-supporting position the paper section 53t is ready to be extracted. This is accomplished by first drawing down the folded edge 53u and bringing it in the path of a pair of rollers. The means provided for first drawing down this edge comprises a set of suction cups 215 (see Figs. 12 and 24), which are mounted on and connected to the hollow shaft 216. This shaft is rotatably mounted in journal blocks 217 which are mounted on, and travel with reciprocating bars 218. To actuate the bars 218 there is provided on each a cross-head-block 219 (see Fig. 12) which is engaged between the forked end 220 of the levers 221 which are secured to a crank shaft 222; this shaft is journalled in bearing boxes 223—223 and has keyed thereto a pinion 224 which is engaged by a rack 225, the teeth of said rack being held in mesh with the teeth of the pinion 224 by a roller 226 on a bracket arm 227.

Reciprocating motion is imparted to the rack 225 (see Figs. 8, 9 and 12) by the cams 228 and 229 on the shaft 54ª and the cooperating rollers 228ª and 229ª on the rack member 225.

For the purpose of imparting proper motion to the device 215, the shaft 216, previously mentioned as mounted in the travelling blocks 217 has secured thereto the pinion 230, the teeth of which mesh with the teeth of a stationary rack 231 mounted on and supported by one of the side frame members; thus it will be seen that when the shaft 216 is moved laterally with and by the travelling blocks 217, the pinion 230 on the shaft will impart a rotating or rocking movement thereto and to the members 215. These members 215 are hollow and communicate with the interior of the hollow shaft 216 and when moved as just described, their open ends or mouths 215ª will contact the paper section 53ᵗ; at the moment of this contact a valve 240 (see Fig. 5) is operated to establish communication between the hollow shaft 216 and a vacuum-pipe-line 241, 241ª, which is connected to some form of air exhaust device not shown.

The mechanism for operating the valve 240 comprises a cam 242 set-screwed on the shaft 54ᵉ which rides the roller 243 on a lever 244; this lever affords adjustable connection through a slot 244ª to a connecting link 245 for oscillating the valve-plate 240ª of the valve 240. A spring 246 serves to retract the plate 240ª.

The vacuum created as just described in the members 215 will operate to draw the paper section into the path of a semi-cylindrical gripper member 247 which co-operates with a roller 248; this roller 248 is preferably mounted in spring-pressed journal boxes 249 to yieldingly accommodate paper sections of various thicknesses.

As the paper section is carried along, the path thereof is controlled by the curved guides 250 which are loosely mounted on the shaft 251 and held in normal operative position by the spring 252; this normal position leads the paper sections to a pair of gripper rollers 255—256, the latter of which is yieldingly mounted and pressed toward the roller 255 by the springs 257. The purpose and object of yieldingly mounting the guide 250 is to preclude the possibility of feeding a rumpled or otherwise mis-shapen paper section through the rollers 255—256. It will be noted that the curved portion of these guides follows the contour of the semi-cylinder 247 and the intervening space therebetween permits a paper section of normal thickness and in proper condition to pass, but in the event of accidental mis-shaping or rumpling of the paper, the guides will rock away from the semi-cylinder 247 and the ends 250ª of the guides will then not be in position to feed such a distorted paper section to the rollers 255 and 256.

When the paper section is passed through the rollers 255—256, it is intended to be conveyed toward the next head by means of a conveyor assembly; this assembly consists of two parallel longitudinally disposed angle-bars 257ᶠ—258ᶠ, (see Figs. 14—15—16 and 18) properly spaced to guide the paper sections, and a pair of slotted chain and tappet guides 257ª and 258ª extending between and parallel to the angle-bars. A set of flat bars 257ᵍ lying between these guides and supported by the cross members 258ⁱ complete the main platform or race-way of the conveyor bed. Just above the bars 257ᵍ, extending interruptedly are short bars 257ʰ of a length only slightly greater than the paper sections. These short bars constitute what may be termed a receiving platform; there is one such platform associated with each head for receiving the section directly therefrom and prevents contact between that section and any other previous one or ones until their corresponding edges are made to coincide by the action of tappets on a conveyor chain, which will be hereinafter described.

It will be understood that in practice it will be inconceivable to so accurately time the depositing of each paper section upon the other or others as to bring their edges absolutely in the same line; therefore each paper section is as stated, deposited upon the upper receiving platform composed of the short bars 257ʰ where it will idle until urged by the conveyor device which will impel that one together with one riding along on the lower bars which was deposited from a preceding head and was subsequently transferred from the receiving platform to the main bed of the conveyor. When arriving at the terminal of the platform it will then also be dropped off and lie immediately over the preceding one or ones and their edges will then be coincident, without regard to which was first contacted or urged by the tappets. The platform situated and functioning as described constitutes means for correcting the timing of the machine and provides automatic means for evening up the insert sections.

The guides 257ª—258ª are arranged to securely hold and cover the chains, having formed integral therewith the guards 257ʳ and 258ʳ overlying the chains 257 and 258 respectively and leaving a slot 257ˢ and 258ˢ through which the upwardly extending tappets 260 protrude. These tappets are of sufficient length to properly engage the paper sections which lie, not only on the lower level conveyor bed members, but also on the upper platform, in the manner just previously described.

The chains 257—258 run over sprockets 257ᵇ—257ᶜ and 258ᵇ—258ᶜ; the head end running over the sprockets 257ᵇ and 258ᵇ and the foot end over sprockets 257ᶜ—258ᶜ, the direction of travel of the work-side of the conveyor being from head to foot. The upper ply runs in the guides as stated and the course of the lower ply is controlled by the idler wheels 257ᵈ—258ᵈ and 257ᵉ—258ᵉ which serve to lead this return ply free of certain parts of the machine and also provides means whereby the total chain length may admit of proper number and spacing of the tappets 260.

The sprocket wheels 257ᶜ, 258ᶜ are mounted and keyed to the shaft 258ᵍ, which is driven by the shaft 64ⁱ through the chain 258ᵍ which runs over a sprocket wheel 258ʰ and a drivewheel 258ⁱ on the shaft 64ⁱ. The connection between the sprocket 258ⁱ and the shaft 64ⁱ is in the form of a friction clutch, the bent lever 300 being pivoted at 301 and held by a resisting spring 302 so that the clutch members 300ª and 64ⁿ will transmit a force controlled by the spring 302. This clutch device is provided so that in case the conveyor becomes overloaded by any cause, no serious damage will result to the machine.

To insure that the paper section, having passed the rollers 255—256, is in proper position, that is, lying flat upon the conveyor bed-rails 262—263 and not still partly resting upon the roller 255 so that the tappets 260 may properly engage and propel the section, there is provided an oscillating lever-arm 264 mounted on a rock shaft 265 and actuated through an arm 266 and a bar 267 by a cam 268 which is keyed to one of the transverse shafts; the bar 267 serves to interconnect and operate the member 264 in each of the several heads. In practice it is found that when the paper sections are travelling at proper speed the momentum acquired thereby is sufficient to carry them from between the rollers 255—256, but in the event of the slowing up of the machine the condition as described might occur, thus damaging the paper sections and jamming up the entire machine.

It will be understood that as the several paper sections in the heads 54—55 and 56 are gathered, they are carried along by the conveyor, the mechanism in each is timed so that as the sections in head 54 arrive at the head 55 a section therefrom is deposited immediately over it and both sections then continue their travel, and are joined by a paper section from the head 56; these accumulated sections are then introduced into the cover section extracted from the head 57.

The cover section is operated upon by the mechanism in the head 57 in the same manner as the other sections up to the point of passing through the rollers 255—256. As this cover section with its folded edge emerges from these rollers it is acted upon by a pair of attrition devices 320, 321 mounted on the shafts 64$^k$ and 64$^j$, respectively (see Fig. 13). These attrition devices are in the form of segments of unequal radii and being driven at equal angular speeds by the spur gears 64$^l$ and 64$^m$ mounted upon the same respective shafts, their peripheries will travel at differential speeds. The action of these rollers is indicated diagrammatically in Figs. 22, 23 and 24 showing the progress of the paper section 53$^e$ as it is first gripped at 320$^a$ and 321$^a$ by the rollers which take hold of the folded edge 53$^f$, as indicated, of the paper section; the lower ply 53$^g$ of the section will be fed faster by the larger segment 321 than the upper ply 53$^i$, and as indicated in Fig. 22 the edge remote from the folded edge will become advanced, one beyond the other sufficiently so that the upper ply 53$^i$ will be exposed to the gripping action of the grip-fingers 330 which will hold that ply, as seen in Fig. 23, and allow the lower ply 53$^g$ to fall below the path of the incoming paper sections which are to be stuffed therebetween.

The members 330 are mounted on the rock-shaft 331 which is supported by the arm 332 and its roller 333 following the cam 334 (see Fig. 10), which is made adjustable for proper timing by the bolts 335 in the slots 336.

The sections to be stuffed are conveyed by the tappets to an oscillating feeder device 340 (see Fig. 13), which supports them pending their final introduction into the cover section by the pusher-arm 400. This arm is timed to travel faster than the tappets 260 so as to carry the section out of the way of the said tappets as they round the sprockets 257$^c$ and 258$^c$, as shown in Fig. 13.

The pusher-arm 400 is pivotally mounted on the shaft 401 (see Fig. 24), and is actuated through the connecting rod 402, the crank arms 403 and 403$^a$, pivoted at 403$^b$, and the pitman rod 403$^c$, by the cam 403$^d$ on the shaft 54$^a$.

As this arm 400 concludes its operation and the grippers 330 release the cover section and the entire assembly comprising the complete edition or unit is then deposited on a slotted platen 405 from which it is transferred by a short conveyor belt 406, which is so mounted that though it travels continuously, it does not urge the unit onward; the surface of the platen 405 is smooth and offers no frictional resistance to the paper in passing thereover, but the conveyor 406 is made of material, such as fabric or the like, and presents a frictional surface and therefore is preferably caused to act intermittently for conveying the paper unit to the rollers 407, 408; this intermittent action just referred to is produced by mounting the rollers 406$^a$ and 406$^b$ in a carriage or frame 406$^c$, which pivots about the axis of the roller 406$^a$ while the roller 406$^b$ and that end of the carriage, is caused to be lowered by action of a cam 409 and a thrust arm 410 attached to the carriage.

The roller 407 (see Figs. 6–10 and 13) is mounted by means of an arm 407$^a$ on a rock shaft 407$^b$ supported in brackets 407$^c$ which are bolted to the main frame. This shaft 407$^b$ is rocked by the cam 334 which actuates an adjusting arm 407$^d$ loosely mounted on the shaft and is adjustably bolted to a short arm 407$^e$; a spring 407$^h$ serves to return the roller 407 in a paper engaging position. The purpose of so mounting the roller 407 is to accommodate for different thicknesses being passed therethrough.

The means for driving the paper transferring member 340 (see Fig. 13) consists of a rock shaft 340$^a$ to which the arm 340$^b$ is secured, and is rocked by the crank arm 340$^c$ (shown in Fig. 10); this arm is connected by a link 340$^d$ to an adjustable actuating device in the form of a disk 340$^e$ having a slot 340$^f$ across its face in which is accommodated the pivot 340$^g$.

At the delivery end of the machine and beyond the rollers 407—408, is a stacking-head 58, the devices therein being actuated by a chain 500 driven by the shaft 54$^a$, driving a counter shaft 501; a sprocket chain 502 transmits power from the shaft 501 to a shaft 503, from which is derived power and motion to operate the stacking and counting devices. The stacking devices include a platform 506 mounted in guides 507—507 for vertical reciprocation; a bracket 508 depending therefrom has pivoted thereto a link 508$^a$ connected to an arm 509 keyed to a rock shaft 510. A short crank arm 511 is also keyed to the shaft 510 and imparts rocking motion thereto by means of the reciprocating bar 512. This bar is slotted at 513 for obtaining the guidance of the shaft 503. Cams 514 and 515 engage rollers 514$^a$—515$^a$, trunnioned on the bar 512 and translate rotary motion of the shaft 503 into reciprocating motion in the bar.

As the platform approaches its upper limit of travel with a paper-unit thereon, a set of movable supporting bars 517—518 (see Figs. 2 and 17) which are normally in paper supporting position, as shown in full lines, are retracted to the position as indicated in dotted lines in Fig. 17, whereupon they are immediately returned to normal position assuming a position beneath the platform and the paper thereon. The platform is then caused to drop, the supporting bars being cleared by the slots 506$^a$ in the platform 506.

The movement of the bars 517, 518 is controlled by the cam 520 keyed to the shaft 503, and a retracting spring 521 attached to the frame of the head 58 and to the lower end of a thrust bar 522; this bar 522 operates the rock shafts 517$^b$ and 518$^b$ which carries the connecting arms 517$^c$, 518$^c$ connected to the bars 517 and 518, respectively. The bar 522 operates the rock shaft 518$^b$ by its connection at 523 to a crank arm 524 keyed to that shaft while the shaft 517$^b$ is rocked by the interconnecting link 525, which is pivoted to the radius members 517$^d$, 518$^d$ keyed to the shafts 517$^b$ and 518$^b$, respectively.

The guides 530, 531 serve to retain the paper units in convenient stock formation.

It is sometimes desirable to keep count or tally of the units as they accumulate in the guides 530, 531 which is usually accomplished by allowing a predetermined number as, for instance, twenty-five units to be added to the stack to form a package or bundle and then provide means of counting the number of bundles. Such a system is here indicated more or less diagrammatically by the counting-wheel 560, which may have twenty-five teeth thereon and the pawl-supporting arm 561 arranged to engage and move one tooth each time one paper is added to the stock by the action of the platform 506. At the conclusion of a complete revolution of the wheel 560, a counter-operating device indicated at 562 mounted for swinging about the axis of the vertical shaft 563 encounters the platform 506 and thus may operate a counter (not shown) of any desired or suitable type.

Certain parts of the mechanism described herein have been previously described and claimed in other applications of mine and hence are not claimed herein.

It will be understood that changes and modifications may be made without departing from the spirit of the invention.

I claim:

1. In a machine of the class specified, endless conveyor means for superposing a plurality of insert sections in a stack and moving said stack and means for inserting the inserts so placed within an open cover section.

2. In a machine of the class specified, endless conveyor means for superposing a plurality of insert sections in a stack and moving said stack, means for inserting the inserts so placed into an open cover section and means for opening the cover section to receive the inserts.

3. In a machine of the class specified, endless conveyor means for superposing a plurality of insert sections in a stack and moving said stack, means for inserting the inserts so placed into an open cover section, means for opening the cover section while held in substantially a horizontal position.

4. In a machine of the class specified, endless conveyor means for assembling a plurality of insert sections in a stack and moving said stack, means for moving the assembled or stacked sections from the conveyor in substantially a horizontal direction for inserting same into an open cover section.

5. In a machine of the class specified, means for supporting two or more stacks of insert sections axially in line, and means moving axially in line with the stack supporting means for collecting two or more sections in superposed relation.

6. In a machine of the class specified, means for supporting two or more stacks of insert sections axially in line, and common means for collecting and moving two or more sections superposed one over the other in the same direction.

7. In a machine of the class specified, means for supporting two or more stacks of insert sections axially in line, and common means for simultaneously moving two or more sections, superposed one over the other, in the same direction.

8. In a machine of the class specified, means for supporting two or more stacks of insert sections axially in line, and common means for simultaneously moving two or more sections, superposed one over the other.

9. In a machine of the class specified, means for selecting two insert sections from accumulated supplies in separate stacks, means for moving said two insert sections, in separated horizontal planes, in the same direction, separate supporting means for each of the insert sections, and means for superposing one of the insert sections upon the other.

10. In a machine of the class specified, means for selecting two insert sections from accumulated supplies in separate stacks, common means for moving said two insert sections, in separated horizontal planes, in the same direction, separate supporting means for each of the insert sections, and means for superposing one of the insert sections upon the other.

11. In a machine of the class specified, means for selecting two insert sections from accumulated supplies in separate stacks, means for moving said two insert sections in the same direction, separate means for supporting them in substantially horizontal position while so moving and means for superposing one of the insert sections upon the other.

12. In a machine of the class specified, means for selecting two insert sections from accumulated supplies in separate stacks, means for moving said two insert sections in the same direction, separate means for supporting them while so moved, the separate supporting means including a main conveyor-bed and a superposed platform, means for superposing one of the insert sections upon the other.

13. In a machine of the class specified, means for selecting two insert sections from accumulated supplies in separate stacks, means for moving said two insert sections in the same direction, separate means including an element on which an insert may idle for correcting the supporting means including a main conveyor-bed and a superposed platform, the said separate supporting means being parallel to each other and lying in the plane of the direction of the movement of the sections, and means for superposing one of the insert sections upon the other.

14. In a machine of the class specified, means for selecting two insert sections from accumulated supplies in separate stacks, means for horizontally superposing one insert directly over another insert and means for correcting the timing of such superpositioning.

15. In a machine of the class specified, means for selecting two insert sections from accumulated supplies in separate stacks, means for depositing one insert section substantially in line with and over another insert section and means for positively lining up the said sections.

16. In a machine of the class specified, means for selecting two insert sections from accumulated supplies in separate stacks, means for depositing one insert section substantially over another insert section, means for conveying such sections, and means for delaying the conveyance of one section until both sections are in line.

17. In a machine of the class specified, containing a series of stacks of sections, one of the stacks composed of cover sections and the remaining stacks composed of insert sections, means for feeding sections from the stacks, traveling means for horizontally conveying the insert sections, stacked one over the other, toward the cover sections and means for inserting said insert sections so stacked into the cover sections.

18. In a machine of the class specified containing a series of stacks of sections, one of the stacks composed of cover sections and the remaining stacks composed of insert sections; means for extracting one section from each stack and superposing one insert over the other; traveling means for conveying the insert sections toward the cover sections and means for inserting said insert sections into the cover sections.

19. In a machine of the class specified containing a series of stacks of horizontally disposed sections, one of the stacks composed of cover sections and the remaining stacks composed of insert sections, means for feeding sections from the stacks, means for gathering and assembling the insert sections, traveling means for conveying the insert sections toward the cover sections and means for inserting the insert sections into the cover sections.

20. In a machine of the class specified containing a series of stacks of horizontally disposed sections, one of the stacks composed of cover sections and the remaining stacks composed of insert sections, means for feeding sections from the stacks, means for horizontally gathering and assembling the insert sections, traveling means for conveying the insert sections toward the cover sections and means for inserting the insert sections into the cover sections.

21. In a machine of the class specified containing a series of stacks of horizontally disposed sections, one of the stacks composed of cover sections and the remaining stacks composed of insert sections, means for feeding sections from the stacks, means for gathering and assembling the insert sections, traveling means for horizontally conveying the insert sections toward the cover sections and means for inserting the insert sections into the cover sections.

22. In a machine of the class specified containing a series of stacks of horizontally disposed sections, one of the stacks composed of cover sections and the remaining stacks composed of insert sections, means for feeding sections from the stacks, horizontal means for gathering and assembling the insert sections and traveling means for horizontally conveying the insert sections to the cover sections, and means for inserting the insert sections into the cover sections.

23. In a machine of the class specified containing a series of stacks of sections, one of the stacks composed of cover sections and the remaining stacks composed of insert sections; means for extracting one insert section at a time and means for arranging the insert sections so extracted in a vertical pile and conveying the pile so formed toward the extracted cover section and means for inserting the inserts in the said cover.

24. In a machine of the class specified containing a series of stacks of sections horizontally disposed therein, one of the stacks composed of cover sections and the remaining stacks composed of insert sections; means for extracting one insert section at a time and means for arranging the insert sections so extracted in a vertical pile and conveying the pile so formed toward the extracted cover section and means for inserting the inserts in the said cover.

25. In a machine of the class specified containing a series of stacks of sections horizontally disposed therein, one of the stacks composed of cover sections and the remaining stacks composed of insert sections; means for extracting one insert section at a time from each of the insert stacks; means for arranging the insert sections so extracted in a vertical pile, and horizontal means for conveying the pile so arranged toward an extracted cover section, and means for inserting the inserts in said extracted cover section.

26. In a machine of the class specified containing a series of stacks of sections horizontally disposed therein, one of the stacks composed of cover sections, and the remaining stacks composed of insert sections; means for arranging the insert sections so extracted in a vertical pile and means for horizontally conveying the pile so arranged toward an extracted cover section, and means for inserting the inserts in said extracted cover section.

27. In a machine of the class specified containing a series of stacks of sections, one of the stacks composed of cover sections horizontally disposed therein and the remaining stacks composed of insert sections horizontally disposed therein; means for extracting one section at a time from the bottom of each of the stacks and traveling means for horizontally conveying the sections so extracted away therefrom to a point of delivery.

28. In a machine of the class specified containing a series of stacks of sections, one of the stacks composed of cover sections and the remaining stacks composed of insert sections; means for extracting one section at a time from each of the containers, means for forming a pile of the insert sections so extracted and means for inserting the pile so formed into one of the cover sections.

29. In a machine of the class specified containing a series of stacks of sections, one of the stacks composed of cover sections horizontally disposed therein and the remaining stacks composed of insert sections; means for extracting one section at a time from each of the stacks, means for forming a pile of the insert sections so extracted and means for inserting the pile so formed into one of the cover sections.

30. In a machine of the class specified containing a series of stacks of sections, one of the stacks composed of cover sections and the remaining stacks composed of insert sections horizontally disposed therein; means for extracting one section at a time from each of the stacks, means for forming a pile of the insert sections so extracted and means for inserting the stack so formed into one of the cover sections.

31. In a machine of the class specified containing a series of stacks of sections; one of the stacks composed of cover sections and the remaining stacks composed of insert sections; means for extracting one section at a time from each of the stacks, means for forming a vertical pile of the insert sections so extracted; travelling means for conveying the insert sections toward the cover sections and means for inserting the insert sections into one of the cover sections.

32. In a machine of the class specified containing a series of stacks of sections, one of the stacks composed of cover sections and the remaining stacks composed of insert sections, means for extracting one section at a time from each of the containers, means for superposing the insert sections, traveling means for horizontally conveying the insert sections so superposed, toward the cover sections and means for inserting the insert sections into one of the cover sections.

33. In a machine of the class specified containing a series of stacks of sections, one of the stacks composed of cover sections and the remaining stacks composed of insert sections.

means for extracting one section at a time from each of the stacks; means for superposing the insert sections, traveling means for conveying the insert sections so superposed, toward the cover sections and means for inserting the insert sections into one of the cover sections.

34. In a machine of the class specified containing a series of stacks of sections horizontally disposed therein, one of the stacks composed of cover sections and the remaining stacks composed of insert sections; means for extracting one section at a time from each of the stacks, means for forming a pile of the insert sections so extracted, traveling means for horizontally conveying the pile of insert sections toward the cover sections and means for inserting the pile of inserts into one of the cover sections.

35. In a machine of the class specified containing a series of stacks of sections horizontally disposed therein, one of the stacks composed of cover sections and the remaining stacks composed of insert sections; means for extracting one section at a time from each of the stacks, means for forming a pile of the insert sections so extracted, traveling means for horizontally conveying the pile of insert sections toward the cover sections, and means for horizontally maintaining the cover section while receiving the pile of insert sections.

36. In a machine of the class specified containing a series of stacks of sections horizontally disposed therein, one of the stacks composed of cover sections and the remaining stacks composed of insert sections, means for extracting one section from each stack, traveling means for horizontally conveying the insert sections so extracted toward the cover sections and means for opening the cover section to receive the said insert sections.

37. In a machine of the class specified containing a series of stacks of sections, one of the stacks composed of cover sections horizontally disposed therein and the remaining stacks composed of insert sections, means for extracting one section from each stack, traveling means for conveying the insert sections so extracted toward the cover sections and means for opening the cover section to receive the said insert sections.

38. In a machine of the class specified containing a series of stacks of sections, one of the stacks composed of cover sections and the remaining stacks composed of insert sections horizontally disposed therein, means for extracting one section from each stack, traveling means for horizontally conveying the insert sections so extracted toward the extracted cover section and means for opening the cover section to receive the said insert sections.

39. In a machine of the class specified, having a stationary conveyor bed in substantially a horizontal plane, means for feeding paper sections thereto and means cooperating with the feeding means for positively depositing the paper sections directly on the bed of the said conveyor.

40. In a machine of the class specified having a conveyor in substantially a horizontal plane, means for feeding paper sections thereonto and means cooperating with the said feeding means for positively depositing the paper sections directly on the bed of the said conveyor, the said second means which cooperates with the feeding means, consisting of rocking or oscillating bars arranged to act on the paper immediately upon its emergence from the said feeding means.

41. In a machine of the class specified in combination with a conveyor for handling paper sections, travelling chains and tappets attached to the said chains, said tappets extending above the bed of the said conveyor to engage the sections; rollers for feeding the sections to the said conveyor and oscillating bars arranged to place the paper sections on the conveyor within the extent of the said tappets.

42. In a machine of the class specified, means for assembling a plurality of insert sections, means for inserting the inserts so assembled into an open cover section, means for opening the cover section while held in substantially a horizontal position, the said opening means including a set of attrition rolls.

43. In a machine of the class specified, means for assembling a plurality of insert sections, means for inserting the inserts so assembled into an open cover section, means for opening the cover section while held in substantially a horizontal position, the said opening means including a set of segmental attrition rolls.

44. In a machine of the class specified, means for assembling a plurality of sections, means for inserting the sections so assembled into an open cover section, the inserting means including oscillating pusher arms.

45. In a machine of the class specified, means for assembling a plurality of insert sections, means for moving the assembled sections in substantially a horizontal direction, and means for inserting same into an open cover section, the said inserting means including oscillating pusher arms.

46. In a machine of the class specified means for assembling a plurality of insert sections, means for piling them one over the other, means for moving the pile so assembled in a horizontal direction toward an open cover section for inserting the said pile in the said cover section, means for holding the cover opened for the reception of the said pile of insert sections; the means for holding the cover open including a gripping device arranged to operate on one of the plies of the said cover.

47. In a machine of the class specified means for assembling a plurality of insert sections, means for piling them one over the other, means for moving the pile so assembled toward an open cover section and inserting the said pile in the said cover section, means for holding the cover section opened for the reception of the said pile of insert sections; the means for holding the cover open including a gripper arm mounted on a shaft for rocking therewith.

48. In a machine of the class specified means for assembling a plurality of insert sections, means for piling them one over the other, means for moving the pile so assembled toward an open cover section and inserting the said pile in the said cover sections, means for holding the cover section opened for the reception of the said pile of insert sections; the means for holding the cover open including a rock shaft, a gripper arm mounted thereon and means for rocking the shaft and thereby the gripper arm.

49. In a machine of the class specified containing a plurality of stacks of horizontally disposed paper sections, means for extracting one section at a time from each of the stacks, and means for moving the sections so extracted in a plane substantially horizontal; the extracting means including a suction device arranged to contact the bottom section in each stack.

50. In a machine of the class specified contain-

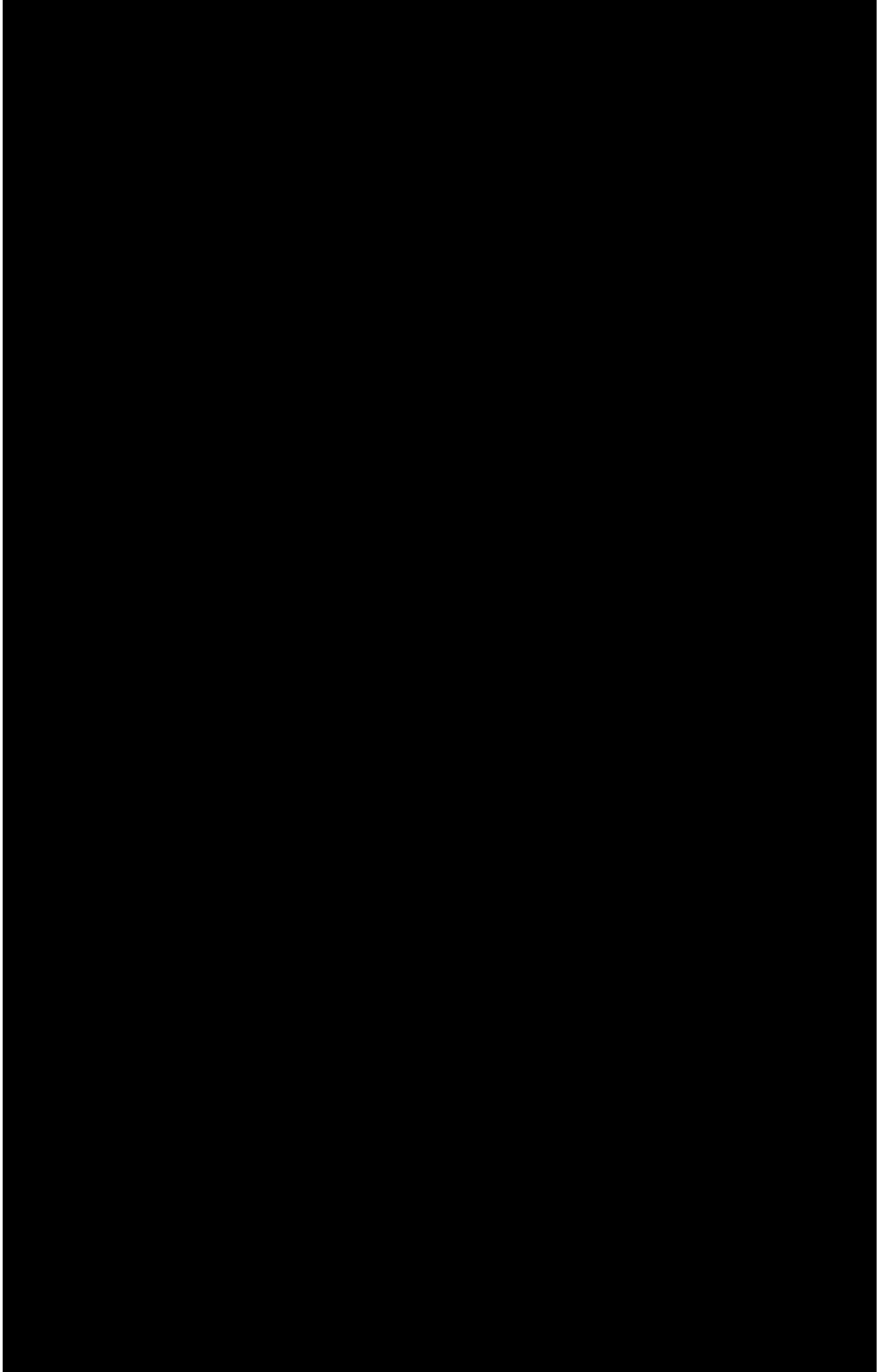

paper cover section and means for opening the said newspaper cover section to receive the inserts, while held in substantially a horizontal position.

71. In a machine of the class specified, means for moving two or more newspaper sections superposed in non-nested relation one over the other in the same direction, and means for opening a cover section to receive the superposed sections.

72. In a machine of the class specified, common means for moving two or more newspaper sections superposed in non-nested relation one over the other in the same direction, and means for opening a cover section to receive the superposed sections.

73. In a machine of the class specified, common means for simultaneously moving two or more newspaper sections, superposed in non-nested relation one over the other, in the same direction, and means for opening a cover section to receive the superposed sections.

74. In a machine of the class specified, common means for simultaneously moving two or more newspaper sections, superposed in non-nested relation one over the other, and means for opening a cover section to receive the superposed sections.

75. In a machine of the class specified, a series of magazines, each containing a stack of horizontally disposed newspaper sections; means for feeding the sections from the magazines, a single traveling means for horizontally conveying the sections from each magazine and depositing each successive section on the preceding one.

76. In a machine of the class specified, a series of magazines each containing a stack of newspaper sections, means for feeding the sections from the magazines, a single traveling means for horizontally conveying the sections therefrom and depositing each successive section upon the preceding one.

77. In a machine of the class specified, a series of magazines each containing a stack of newspaper sections, means for feeding the sections from the magazines, a single traveling means for gathering the sections and superposing one over the other and conveying them so gathered to one point.

78. In a machine of the class specified, a series of magazines each containing a stack of newspaper sections horizontally disposed therein, means for feeding the sections from the magazines, a single traveling means for horizontally conveying the sections therefrom, and means for superposing one section over the other.

79. In a machine of the class specified, a series of magazines each containing a stack of newspaper sections, means for feeding the sections from the magazines, a single traveling means for gathering the sections together superposed consecutively one over the other and horizontally conveying them to one point.

80. In a machine of the class specified, a series of magazines each containing a stack of newspaper sections; means for feeding the sections from the magazines, means for consecutively gathering and superposing one over the other and a single traveling means for horizontally conveying the newspaper sections from the said magazines.

81. In a machine of the class specified containing a plurality of stacks of horizontally disposed newspaper sections, means for extracting one newspaper section at a time from each of the stacks, and means for moving the sections so extracted in a plane substantially horizontal; the extracting means including a suction device arranged to contact the bottom section in each stack.

82. In a machine of the class specified, means for superposing a plurality of folded newspaper inserts in a stack in non-nested relation, the superposition taking place as the lower newspaper insert is moving, and means for nesting the superposed sections in a folded cover section.

83. In a machine of the class specified, means for superposing a plurality of folded newspaper inserts in a stack in non-nested relation, the superposition taking place as both newspaper inserts move, and means for nesting the superposed sections in a folded cover section.

84. In a machine of the class specified, means for superposing a plurality of folded newspaper inserts one upon another in non-nested position, the superposition of each newspaper insert taking place as the underneath insert or inserts are moving, and means for nesting the superposed sections in a folded cover section.

85. In a machine of the class specified, means for superposing a plurality of folded newspaper inserts in a stack in non-nested position, and means for advancing and nesting the newspaper inserts after superposition in a folded cover section.

86. In a machine of the class specified containing a series of newspaper insert sections and a newspaper cover section, means for consecutively gathering the newspaper insert sections together in a pile, superposed one over the other in non-nested relation, and conveying them, so gthered, to one point to be nested into the newspaper cover section.

87. In a machine of the class specified, means for assembling a plurality of insert sections, means for stacking them adjacent and parallel to each other in non-nested relation, and means for removing them, so placed, toward an open cover section.

88. In a machine of the class specified, containing a series of stacks of newspaper sections arranged side by side in a longitudinal row, one of the stacks composed of cover sections and the remaining stacks composed of insert sections, a conveyor bed extending along the entire length of the said row, a series of superposed platforms over the conveyor bed and parallel thereto, each associated with a magazine containing insert sections; automatic means for extracting one section at a time from each magazine and depositing an insert section on each of the said superposed platforms; means for moving the sections from the said platforms so as to drop them consecutively one upon another and onto the said conveyor bed, and means for conveying the sections so dropped to and into an open cover section.

89. In a machine of the class specified, comprising a series of magazines arranged in a row, each containing newspaper sections, the said magazines spaced apart so that the intervening space between each exceeds the width of a newspaper section; a main conveyor bed extending the entire length of the said row and parallel thereto; a series of relatively short platforms parallel to the main conveyor bed interposed in a plane between that of the said main conveyor bed and the said row, said platforms extending from the front or discharge side of one magazine and terminating just short of the back of the next adjacent magazine; means for discharging a section from each magazine onto its corresponding platform and means for dropping the sections from the platforms to the main conveyor bed or upon a section previously dropped thereon, the platforms thus constituting means whereby all of the sections so dropped may be aligned while being moved along the main conveyor bed.

90. In a machine of the class specified including a series of magazines arranged side by side in a longitudinal row and spaced from each other and containing newspaper sections, a main conveyor bed extending the entire length of and parallel to the row of magazines, a series of short platforms intermediate the magazines and parallel to the main conveyor bed, located in a plane between the bed and the magazines, said platforms arranged to receive the newspaper sections from the magazines, and means for transferring the sections from the platforms onto the main conveyor bed.

91. In a machine of the class specified including a series of magazines arranged side by side in a longitudinal row and spaced from each other and containing newspaper sections, a horizontal conveyor extending the entire length of the row of magazines, a series of short platforms intermediate the magazines and parallel to the main conveyor bed, located in a plane between the bed and the magazines, said platforms arranged to receive the newspaper sections from the magazines, and means for dropping the sections from the platforms onto the main conveyor bed.

92. In a machine of the class specified, including a series of magazines each containing folded newspaper sections, said magazines arranged side by side in a longitudinal row; means for extracting the sections from the magazines; a series of short platforms beneath the magazines for receiving the sections as they are extracted; a longitudinal conveyor extending the entire length of the row of magazines and parallel thereto, means for dropping the said sections from the said platforms to the main conveyor bed, the two said means arranged to move the sections with the folded edges in the direction of travel.

93. In a machine of the class specified, including a series of magazines each containing folded newspaper sections, said magazines arranged side by side in a horizontal row; means for extracting the sections from the magazines; a series of short platforms beneath the plane of the magazines and parallel thereto, said platforms arranged to receive the sections from the magazines as they are extracted; a main conveyor bed extending the entire length of the magazines, parallel thereto and to the platforms; means for propelling the sections so as to transfer them from the platforms to the conveyor bed and means for propelling the sections so transferred along the main conveyor bed; said extracting and said propeller means arranged so as to move the sections so that their folded edges will be toward the directions of travel.

94. A machine of the class specified having means for assembling a plurality of closed newspaper sections in a stack to form a non-nested insert unit, means for opening another section to form a cover, and means for inserting said insert unit into said opened cover section.

95. A machine of the class specified having means for opening a newspaper section to form a cover, and means for inserting a non-nested insert unit comprising a plurality of superposed closed newspaper sections into said opened cover section.

96. A machine of the class specified having a series of stacks or holders for newspaper sections, means for assembling a plurality of closed newspaper sections from certain of said stacks or holders to form a non-nested insert unit, means for opening a newspaper section from another of said stacks or holders, and means for inserting the insert unit into said opened cover section.

97. A machine of the class specified having a plurality of stacks or holders arranged in a row and adapted to contain closed newspaper sections, means for superposing closed newspaper sections from certain of said stacks or holders to form a non-nested insert unit comprising a plurality of such newspaper sections, means for opening a newspaper section from another of said stacks or holders, and means for inserting the insert unit formed by said assembled sections into said opened cover section.

98. A machine of the class specified having a plurality of stacks or holders arranged in a row and adapted to contain closed newspaper sections, a traveling assembly member arranged to travel along said row of stacks or holders and to receive newspaper sections therefrom, means for feeding such sections from certain of said stacks or holders to said assembly member so that there shall be formed on said assembly member insert units each comprising a plurality of newspaper sections in a closed non-nested condition, and means for opening a newspaper section from another stack or holder so that said last mentioned section shall constitute a cover for the insert unit, said opening means being arranged and located so as to receive the insert units assembled on said assembly member.

99. A machine of the class specified having a plurality of stacks or holders arranged in a row, an assembly member arranged to travel along said row of stacks or holders and to receive newspaper sections therefrom, means for feeding newspaper sections from certain of said stacks or holders so that newspaper sections from said stacks or holders shall be assembled in closed non-nested condition to form insert units on said assembly member, and means for opening a newspaper section from another stack or holder, said opening means being located substantially at the end of said assembly member so as to receive the insert sections therefrom whereby said insert sections will be deposited into opened cover sections.

100. In a device of the class specified, containing a stack of newspaper sections, means for positively removing the undermost section from the stacks, and means for lifting the rest of the stack while removing said undermost section.

101. In a machine of the class specified, means for disposing one or more stacks of insert sections axially in line, means moving axially in line with the stacks for placing insert sections one upon the other in substantially a horizontal plane, said disposing means being also adapted for moving said insert sections so placed to a cover section.

102. In a machine of the class specified, a series of magazines, each containing a stack of horizontally disposed sections, means for feeding sections from the magazines, and a traveling means for receiving the sections from each magazine and supporting same in an accumulated stack.

103. In a machine of the class specified, a series of magazines each containing a stack of sections, means for feeding the sections from the magazines, and a traveling means for horizontally conveying the sections therefrom, and supporting same in an accumulated stack.

104. In a machine of the class specified, a series of magazines each containing a stack of sections, means for feeding sections from the magazines, and a traveling means for receiving the sections and superposing one over the other and conveying them so gathered to one point in a stack.

105. In a machine of the class specified, a series of magazines each containing a stack of sections horizontally disposed therein, means for feeding sections from the magazines, traveling means for receiving the sections therefrom, and means for superposing one section over the other.

106. In a machine of the class specified, a series of magazines each containing a stack of sections, means for feeding sections from the magazines, and traveling means for receiving the sections together superposed consecutively one over the other and horizontally conveying them to one point.

107. In a machine of the class specified containing a series of sections horizontally disposed, means for feeding sections from the magazines, and traveling horizontal means for receiving and superposing one over the other and conveying the sections to one point.

108. In a machine of the class specified, a series of magazines containing a stack of sections horizontally disposed therein, means for feeding sections from the stacks, horizontal means for consecutively receiving and superposing one section over the other and conveying the sections therefrom to one point.

109. In a machine of the class specified containing a series of stacks of sections, means for feeding sections from the stacks, means for consecutively receiving the sections together each superposed one over the other and horizontally conveying them to one point.

110. In a machine of the class specified containing a stack of sections, one of the stacks composed of cover sections and the remaining stacks composed of insert sections, means for feeding sections from the stacks, traveling means for collecting and conveying the insert sections consecutively stacked one over the other toward the stack composed of the cover sections.

111. In a machine of the class specified, containing a stack of sections, one of the stacks composed of cover sections and the remaining stacks composed of insert sections, means for feeding sections from the stacks, means for consecutively stacking the insert sections one over the other and traveling means for collecting and horizontally conveying the insert sections in a stack toward the stack composed of cover sections.

112. In a machine of the class specified containing a series of stacks of sections horizontally disposed therein, one of the stacks composed of cover sections and the remaining stacks composed of insert sections, means for extracting one insert section from each stack and superposing one over the other and traveling means for collecting and conveying the insert sections in superposed relation toward the stack composed of cover sections.

113. In a machine of the class specified containing a series of stacks of sections, one of the stacks composed of cover sections and the remaining stacks composed of insert sections, means for feeding sections from the stacks, traveling means for gathering the insert sections together superposed one over the other and horizontally conveying them in superposed relation to one point, that is, toward the stack composed of cover sections, into one of which they are to be inserted.

114. In a machine of the class specified, containing a series of stacks of sections, one of the stacks composed of cover sections and the remaining stacks composed of insert sections, means for feeding sections from the stacks, traveling means for consecutively gathering and stacking the insert sections thereon and means for inserting the insert sections into the cover sections.

115. In a machine of the class specified containing a series of stacks of sections, one of the stacks composed of cover sections and the remaining stacks composed of insert sections, means for feeding sections from the stacks, traveling means for supporting and conveying the insert sections stacked one over the other toward the cover sections and means for inserting the said insert sections into the cover sections.

116. In a machine of the class specified containing a series of stacks of insert sections and a stack of cover sections, means for extracting one section at a time from the bottom of each stack and traveling means for forming and supporting a pile of the insert sections so extracted for inserting in a cover section.

117. In a machine of the class specified containing a series of stacks of insert sections and a stack of cover sections; means for extracting one section at a time from the bottom of each stack and traveling means for arranging and supporting the said insert sections so extracted in a vertical pile to be deposited in one of the cover sections.

118. In a machine of the class specified containing a series of stacks of horizontally disposed insert and cover sections; means for extracting one section at a time from the bottom of each stack and traveling means for arranging and supporting the insert sections so extracted in a vertical pile to be deposited in one of the cover sections.

119. In a machine of the class specified containing a series of stacks of insert and cover sections; means for extracting one section at a time from the bottom of each stack and traveling means for forming and supporting a pile of the insert sections so extracted, and means for inserting the pile of inserts into one of the cover sections.

120. In a machine of the class specified containing a series of stacks of sections; one of the stacks composed of cover sections and the remaining stacks composed of insert sections; means for extracting one insert section at a time and traveling means for gathering the insert sections so extracted, forming and supporting a pile thereof and conveying the pile so formed toward the extracted cover section, and means for inserting the inserts in the said cover.

121. In a machine of the class specified containing a series of stacks of sections, one of the stacks composed of cover sections horizontally disposed therein and the remaining stacks composed of insert sections; means for extracting one section at a time from the bottom of each of the stacks and traveling means for conveying the insert sections so extracted away therefrom toward and into the extracted cover section.

122. In a machine of the class specified containing a series of stacks of sections, one of the stacks composed of cover sections and the remaining stacks composed of insert sections, horizontally disposed therein; unitary means for extracting one section at a time from the bottom of each of the stacks and traveling means for receiving and conveying the insert sections so extracted away therefrom toward and into the extracted cover section.

123. In a machine of the class specified containing a series of stacks of sections, one of the stacks composed of cover sections horizontally disposed therein, and the remaining stacks composed of insert sections horizontally disposed therein; means for extracting one section at a time from the bottom of each of the stacks and traveling means for conveying the insert sections so extracted away therefrom toward and into the extracted cover section.

124. In a machine of the class specified, containing a series of stacks of sections, one of the stacks composed of cover sections horizontally disposed therein and the remaining stacks composed of insert sections; means for extracting one section at a time from the bottom of each of the stacks and traveling means for horizontally conveying the insert sections so extracted away therefrom toward and into the extracted cover section.

125. In a machine of the class specified containing a series of stacks of sections, one of the stacks composed of cover sections and the remaining stacks composed of insert sections horizontally disposed therein; means for extracting one section at a time from the bottom of each of the stacks and traveling means for horizontally conveying the sections so extracted away therefrom to a point of delivery.

SEVERIN HALVORSEN.